United States Patent
Guo et al.

(10) Patent No.: US 11,437,027 B1
(45) Date of Patent: Sep. 6, 2022

(54) ALTERNATE NATURAL LANGUAGE INPUT GENERATION

(71) Applicant: Amazon Technologies, Inc., Seattle, WA (US)

(72) Inventors: Chenlei Guo, Redmond, WA (US); Xing Fan, Redmond, WA (US); Jin Hock Ong, Seattle, WA (US); Kai Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 16/703,609

(22) Filed: Dec. 4, 2019

(51) Int. Cl.
*G10L 15/197* (2013.01)
*G10L 15/22* (2006.01)
*G10L 15/18* (2013.01)
*G10L 15/30* (2013.01)

(52) U.S. Cl.
CPC ........ *G10L 15/197* (2013.01); *G10L 15/1815* (2013.01); *G10L 15/22* (2013.01); *G10L 15/30* (2013.01); *G10L 2015/223* (2013.01)

(58) Field of Classification Search
CPC ... G10L 15/197; G10L 15/1815; G10L 15/22; G10L 15/30; G10L 2015/223
See application file for complete search history.

(56) References Cited

U.S. PATENT DOCUMENTS

| | | | | |
|---|---|---|---|---|
| 8,290,772 | B1 * | 10/2012 | Cohen | G06F 40/274 704/235 |
| 2003/0040907 | A1 * | 2/2003 | Chang | G10L 15/32 704/231 |
| 2018/0096678 | A1 * | 4/2018 | Zhou | G10L 15/32 |
| 2018/0314689 | A1 * | 11/2018 | Wang | G10L 15/07 |
| 2020/0202845 | A1 * | 6/2020 | Jacobson | G06F 40/30 |

OTHER PUBLICATIONS

Bonadiman et al. "Large Scale Question Paraphrase Retrieval with Smoothed Deep Metric Learning," EMNLP Workshop W-NUT: The 5th Workshop on Noisy User-generated Text, Hong Kong, Nov. 4, 2019, pp. 68-75.

Burges "From RankNet to LambdaRank to LambdaMART: An Overview," Microsoft Research Technical Report MSR-TR-2010-82, 19 pages.

Devlin et al. "BERT: Pre-training of Deep Bidirectional Transformers for Language Understanding," arXiv:1810.04805v2 [cs CL] May 24, 2019, 16 pages.

Guo et al. "A Spelling Correction Model for End-to-End Speech Recognition," arXiv:1902.07178v1 [eess.AS] Feb. 19, 2019, 5 pages.

(Continued)

*Primary Examiner* — Michelle M Koeth
*Assistant Examiner* — Darioush Agahi
(74) *Attorney, Agent, or Firm* — Pierce Atwood LLP

(57) ABSTRACT

Techniques for handling errors during processing of natural language inputs are described. A system may process a natural language input to generate an ASR hypothesis or NLU hypothesis. The system may use more than one data searching technique (e.g., deep neural network searching, convolutional neural network searching, etc.) to generate an alternate ASR hypothesis or NLU hypothesis, depending on the type of hypothesis input for alternate hypothesis processing.

20 Claims, 18 Drawing Sheets

(56) References Cited

OTHER PUBLICATIONS

Henderson et al. "Efficient Natural Language Response Suggestion for Smart Reply," arXiv:1705.00652v1 [cs.CL] May 1, 2017, 15 pages.
Huang et al. "Learning Deep Structured Semantic Models for Web Search using Clickthrough Data," CIKM'13 Oct. 27-Nov. 1, 2013, San Francisco, CA, 8 pages.
Johnson et al. "Billion-scale similarity search with GPUs", arXiv:1702.08734v1 [cs.CV] Feb. 28, 2017, 12 pages.
Muralidharan et al. "Leveraging User Engagement Signals for Entity Labeling in a Virtual Assistant," arXiv:1909.09143v1 [cs LG] Sep. 18, 2019, 9 pages.
Shen et al. "Learning Semantic Representations Using Convolutional Neural Networks for Web Search," WWW'14 Companion, Apr. 7-11, 2014, Seoul, Korea, 2 pages.
Okapi BM25, webpage retrieved on Nov. 9, 2020 via https://en.wikipedia.org/wiki/Okapi_BM25, 5 pages.
XGBoost Documentation, webpage retrieved on Nov. 9, 2020 via https://xgboost.readthedocs.io/en/latest/, 2 pages.
Y. He, J. Tang, H. Ouyang, C. Kang, D. Yin, and Y. Chang, "Learning to rewrite queries," in Proceedings of the 25th ACM International on Conference on Information and Knowledge Management, pp. 1443-1452, 2016.
S. Riezler, Y. Liu, "Query rewriting using monolingual statistical machine translation," Computational Linguistics, vol. 36, No. 3, pp. 569-582, 2010.
J. Wang, J. Z. Huang, D. Wu, "Recommending High Utility Queries via Query-Reformulation Graph", Mathematical Problems in Engineering, vol. 2015, Article ID 956468, 14 pages, 2015.

\* cited by examiner

ALTERNATE NATURAL LANGUAGE INPUT GENERATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
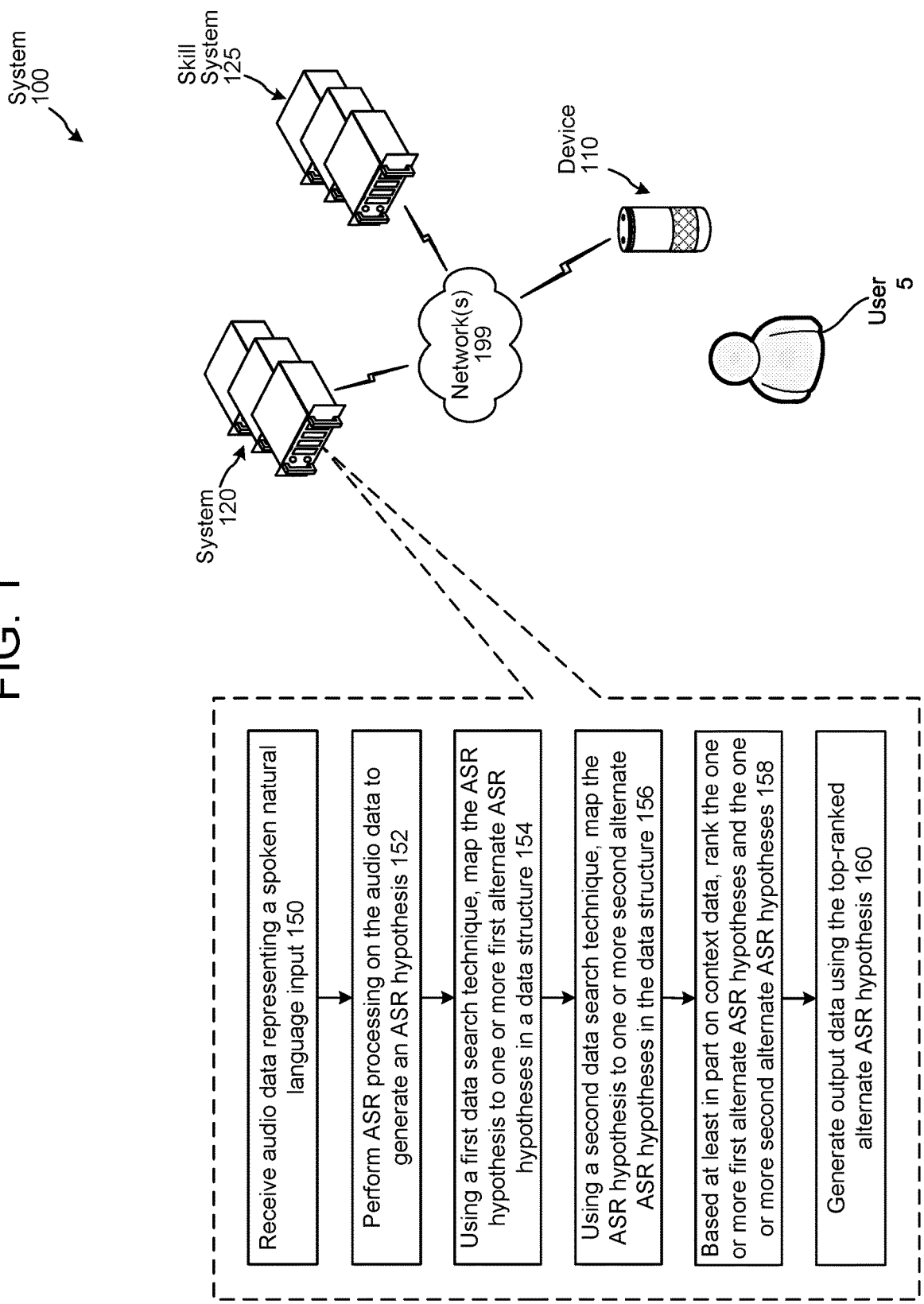
FIG. 1 is a conceptual diagram illustrating a system configured to generate alternate automatic speech recognition (ASR) hypotheses of a spoken natural language input, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

A system may receive a natural language input. For example, a user may speak a natural language input to a device, and the device may send audio data, representing the spoken natural language input, to the system. The system may perform ASR processing on the audio data to generate text data representing the spoken natural language input. The system may perform NLU processing on the text data to determine an intent of the spoken natural language input as well as portions of the text data that may be used to perform an action responsive to the spoken natural language input.

For further example, a user may type a natural language input using a keyboard associated with a device. The device may send text data, representing the typed natural language input, to the system. The system may perform NLU processing on the text data to determine an intent of the typed natural language input as well as portions of the text data that may be used to perform an action responsive to the typed natural language input.

In some situations, an error may occur in the ASR processing of a spoken natural language input. For example, ASR processing my incorrectly transcribe a spoken natural language input due to, for example, poor speech quality, extensive background noise, etc. In other situations, an error may occur in the NLU processing of a spoken or typed natural language input. For example, NLU processing may incorrectly interpret a natural language input based on the natural language input including entities not recognized by the system, the natural language input being in a sentence structure not interpretable by the system, etc.

Errors in ASR and NLU processing may result in an undesirable user experience, especially when the user provided the same natural language input in the past and the system had responded successfully. For example, a user may say "play my media playlist," and in the past the system responded successfully however, in the instant case, due to an error the system may respond "I don't understand" or may not respond at all.

The present disclosure provides techniques for reducing errors resulting from ASR and/or NLU processing of natural language inputs. According to the present disclosure, a system may use a plurality of data search techniques to rewrite a natural language input, which is likely to cause an error or has caused an error, into a form more suitable for processing. In at least some embodiments, one or more indexes may be constructed using previous instances when natural language inputs were rewritten. The plurality of data search techniques may be run against the index(es) to generate one or more rewrite candidates. When more than one rewrite candidate is generated, the rewrite candidates may be ranked using context information. In at least some embodiments, NLU processing and/or an action may be performed with respect to a rewrite candidate instead of the natural language input as originally formulated by the user.

Systems leveraging the teachings herein may provide a more desirable user experience. This is due, at least in part, to the fact that the present disclosure's teachings may result in a decrease in frequency at which unresponsive actions are performed by a system. By decreasing the instances of such actions being performed, user/system interactions may be improved.

A system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to generate alternate ASR hypotheses of a spoken natural language input. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5), a system 120, and a skill system 125 connected across one or more networks 199. While the user 5 is illustrated as being a human, other types of users (e.g., computing systems) may exist.

The device 110 may receive audio corresponding to a spoken natural language input originating from the user 5. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like.

The system 120 may receive (150) the audio data, and perform (152) ASR processing on the audio data to generate an ASR hypothesis (e.g., text data representing the spoken natural language input).

The system 120 may use two or more data search techniques to map the ASR hypothesis to one or more alternate ASR hypotheses in a data structure(s). Illustrative, non-limiting examples of data search techniques include Lucene searching and deep neural searching, etc.

The data structure(s) may include a plurality of natural language input/alternate ASR hypothesis pairings. For example, a natural language input/alternate ASR hypothesis pairing in the data structure(s) may correspond to a previous natural language input (received by the system 120) and corresponding alternate ASR hypothesis (e.g., indicated by a user as being a correct rewrite of the natural language input). In at least some embodiments, the pairings in the data structure(s) may correspond to natural language inputs originating from various users of the system 120.

In at least some embodiments, the pairings in the data structure(s) may correspond to natural language inputs originating from a single user (e.g., the user 5) of the system 120. In such examples, a pairing in the data structure(s) may be associated with metadata representing context information associated with the natural language input of the pairing. For example, the context information may represent a time of day when the natural language input was received, a location of the device that captured the natural language input, etc.

In at least some embodiments, the system 120 may store a different data structure for each type of data search technique implemented by the system 120. For example, the system 120 may store a data structure configured for Lucene searching, a data structure for deep neural searching, etc.

Using a first data search technique, the system 120 may map (154) the ASR hypothesis to one or more first alternate ASR hypotheses (representing one or more first rewritten forms of the spoken natural language input) in a data structure. The system 120 may also, using a second data search technique, map (156) the ASR hypothesis to one or more second alternate ASR hypotheses (representing one or more second rewritten form of the spoken natural language input) in the data structure. When the system 120 stores a different data structure for each data search technique, the system 120 may map the ASR hypothesis to the one or more first alternate ASR hypotheses in a first data structure (traversable by the first data search technique), and may map the ASR hypothesis to the one or more second alternate ASR hypotheses in a second data structure (traversable by the second data search technique).

Steps 154 and 156 may be performed in series, at least partially in parallel, or in parallel.

Based at least in part on context data, the system 120 may rank (158) the one or more first alternate ASR hypotheses and the one or more second alternate ASR hypotheses. The context data may represent a time of day when the spoken natural language input was received, a location of the device that captured the spoken natural language input, etc. For example, if the data structure(s) associates a first alternate ASR hypothesis with a first time of day, the data structure(s) associates a second alternate ASR hypothesis with a second time of day, and the context data represents the spoken natural language input was received during the first time of day, the system 120 may rank the first alternate ASR hypothesis higher than the second alternate ASR hypothesis. For further example, if the data structure(s) associates a first alternate ASR hypothesis with a first location, the data structure(s) associates a second alternate ASR hypothesis with a second location, and the context data represents the spoken natural language input was received while the device 110 was at the first location, the system 120 may rank the first alternate ASR hypothesis higher than the second alternate ASR hypothesis. One skilled in the art will appreciate that more than one type of context data may be considered and, thus, that more complex rankings may be performed by the system 120.

The system 120 may generate (160) output data using the top-ranked alternate ASR hypothesis. For example, the system 120 may perform NLU processing on the top-ranked alternate ASR hypothesis to generate NLU results data, and may send the NLU results data to a skill system 125. The skill system 125 may thereafter perform processing, with respect to the NLU results data, to generate output data. The output data may be responsive to the spoken natural language input (e.g., the output data may be audio data representing music in response to a spoken natural language input of "play my top hits music channel"). Alternatively, the output data may represent the processing performed by the skill system 125 (e.g., the output data may be text data corresponding to "your restaurant reservation has been booked" in response to a spoken natural language input of "book me a dinner reservation at my favorite restaurant for 6 pm").

Figure 2:
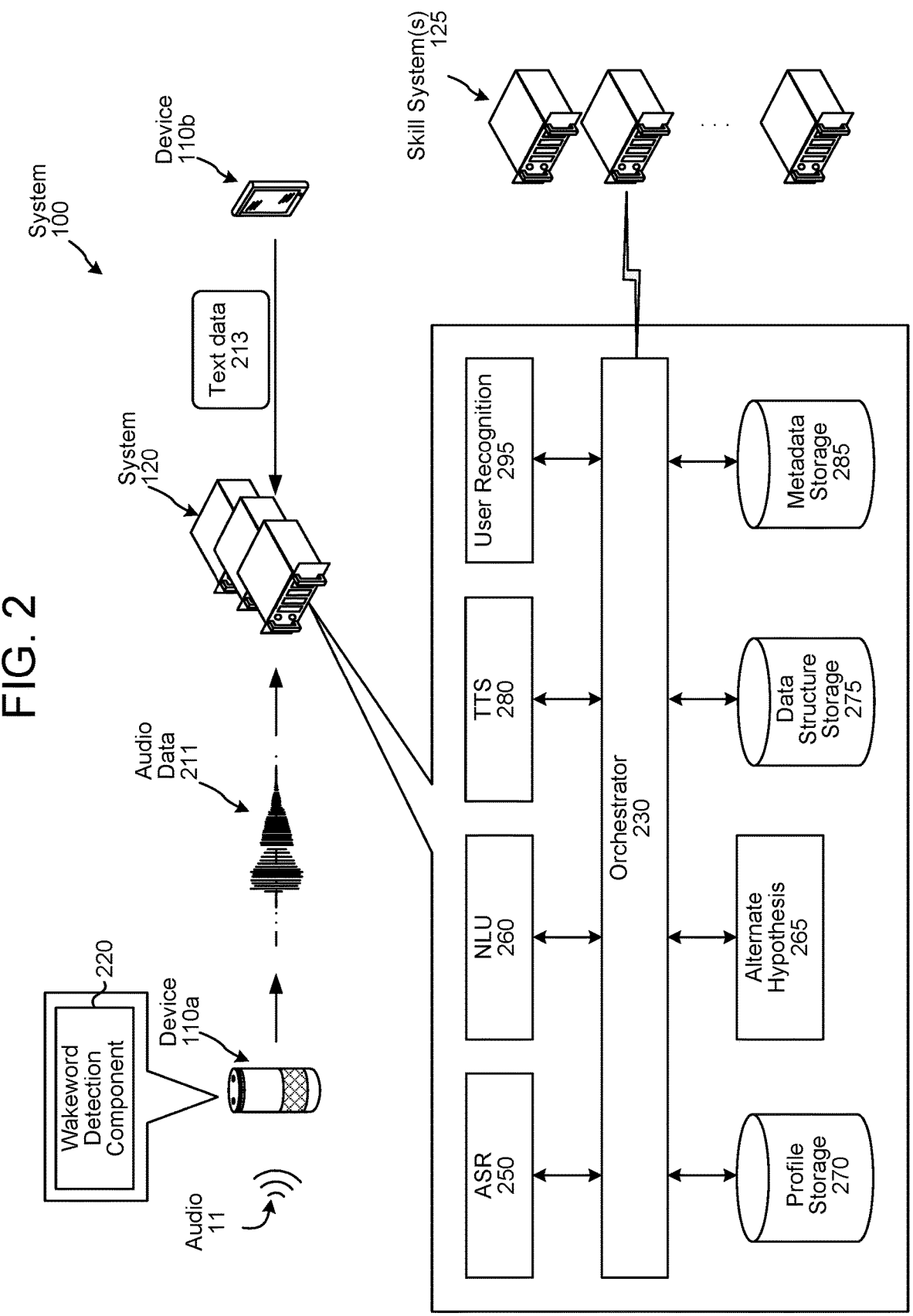
FIG. 2 is a conceptual diagram of components of the system, according to embodiments of the present disclosure.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the system 120. As indicated previously, the device 110a may be configured to detect various wakewords, with each wakeword corresponding to a different assistant. In at least some embodiments, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the system 120. The audio data 211 may include data corresponding to the detected wakeword, or the device 110a may remove the portion of the audio corresponding to the detected wakeword prior to sending the audio data 211 to the system 120.

Figure 3:
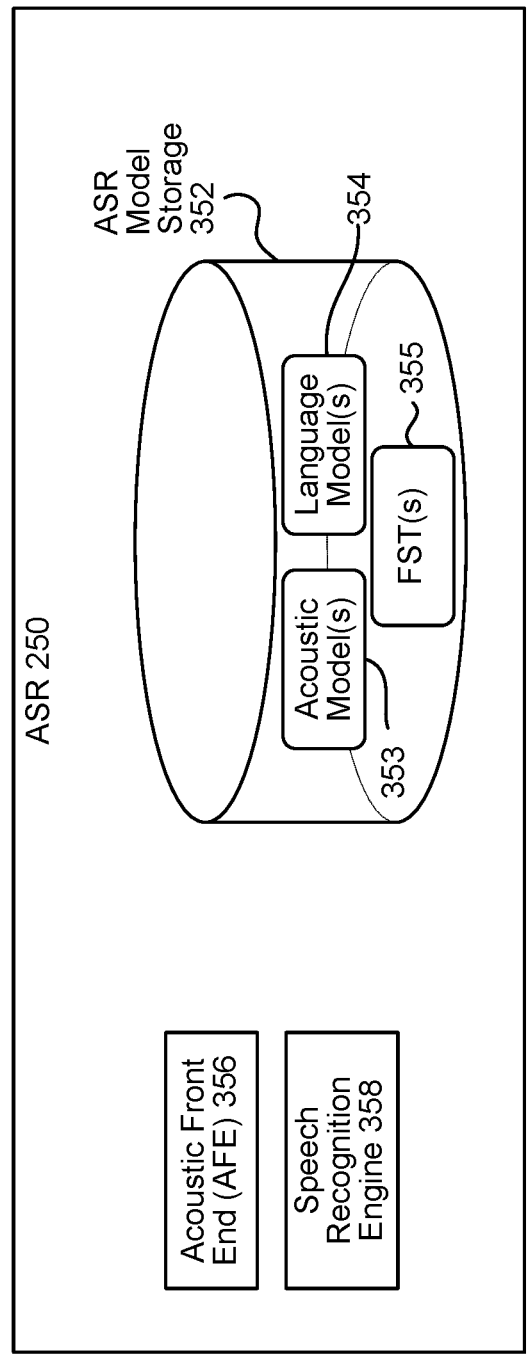
FIG. 3 is a conceptual diagram of ASR components, according to embodiments of the present disclosure.

The system 120 may include an orchestrator component 230 configured to receive the audio data 211 (and optionally and assistant identifier) from the device 110a. The orchestrator component 230 may send the audio data 211 to an ASR component 250 (conceptually illustrated in FIG. 3).

The ASR component 250 transcribes audio data into one or more ASR hypotheses (e.g., one or more different textual representations of the speech contained in the audio data). The ASR hypothesis (or the top-scoring ASR hypothesis when multiple ASR hypotheses are generated for a single natural language input) may be used by various components of the system 120 for various purposes.

The ASR component 250 may interpret a spoken natural language input based on the similarity between the spoken natural language input and pre-established language models 354 stored in an ASR model storage 352. For example, the ASR component 250 may compare the audio data with models for sounds (e.g., subword units or phonemes) and sequences of sounds to identify words that match the sequence of sounds spoken in the natural language input.

Alternatively, the ASR component 250 may use a finite state transducer (FST) 355 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 353 stored in the ASR model storage 352), and the likelihood that a particular word, which matches the sounds, would be included in the sentence at the specific location (e.g., using a language or grammar model 354). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include an acoustic front end (AFE) 356 and a speech recognition engine 358. The AFE 356 transforms the audio data (received from a microphone of the device 110) into data for processing by the speech recognition engine 358. The speech recognition engine 358 compares the data (output by the AFE 356) with acoustic models 353, language models 354, FST(s) 355, and/or other data models and information for recognizing the speech conveyed in the audio data. The AFE 356 may reduce noise in the audio data and divide the digitized audio data into frames representing time intervals for which the AFE 356 determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by the AFE 356 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 358 may process the data, output from the AFE 356, with reference to information stored in the ASR model storage 352. Alternatively, post front-end processed data (such as feature vectors) may be received by the ASR component 250 from another source besides the internal AFE 356. For example, the device 110 may process audio data into feature vectors (for example using an on-device AFE 356) and transmit that information to the system 120 for ASR processing. Feature vectors may arrive at the system 120 encoded, in which case they may be decoded prior to processing by the speech recognition engine 358.

The speech recognition engine 358 attempts to match received feature vectors to language phonemes and words as known in the stored acoustic models 353, language models 354, and FST(s) 355. The speech recognition engine 358 computes scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 358 may use the acoustic model(s) 353 to attempt to match received audio feature vectors to words or subword units. A subword unit may be a senon, phoneme, phoneme in context, syllable, part of a syllable, syllable in context, or any other such portion of a word. The speech recognition engine 358 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 358 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 358, the state may change or stay the same, based on the processing of the new feature vectors. A Viterbi algorithm may be used to find the most likely sequence of states based on the processed feature vectors.

In one example, the speech recognition engine 358 may receive a series of feature vectors for sound corresponding to a user saying "There is a bat in my car." The speech recognition engine 358 may attempt to match each feature vector with a phoneme. As new feature vectors are processed, the speech recognition engine 358 may determine state transitions (for example, using HMMs) to determine whether a probability of whether a state should either remain the same, or change to a new state (i.e., whether an incoming feature vector results in a state transition from one phoneme to another). As the processing continues, the speech recognition engine 358 continues calculating such state transition probabilities. After processing one feature vector, the speech recognition engine 358 may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 358 may also calculate potential states for other phonemes. In this manner multiple states and state transition probabilities may be calculated.

The probable states and probable state transitions calculated by the speech recognition engine 358 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score, or probabilities may be converted to the log domain and added to assist processing.

The speech recognition engine 358 may also compute scores of branches of the paths based on language models or grammars. Language modeling involves determining scores for what words are likely to be used together to form coherent words and sentences. Application of a language model 354 may improve the likelihood that the ASR component 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken natural language input. The language modeling may be determined from a text corpus and may be customized for particular applications.

Figure 4:
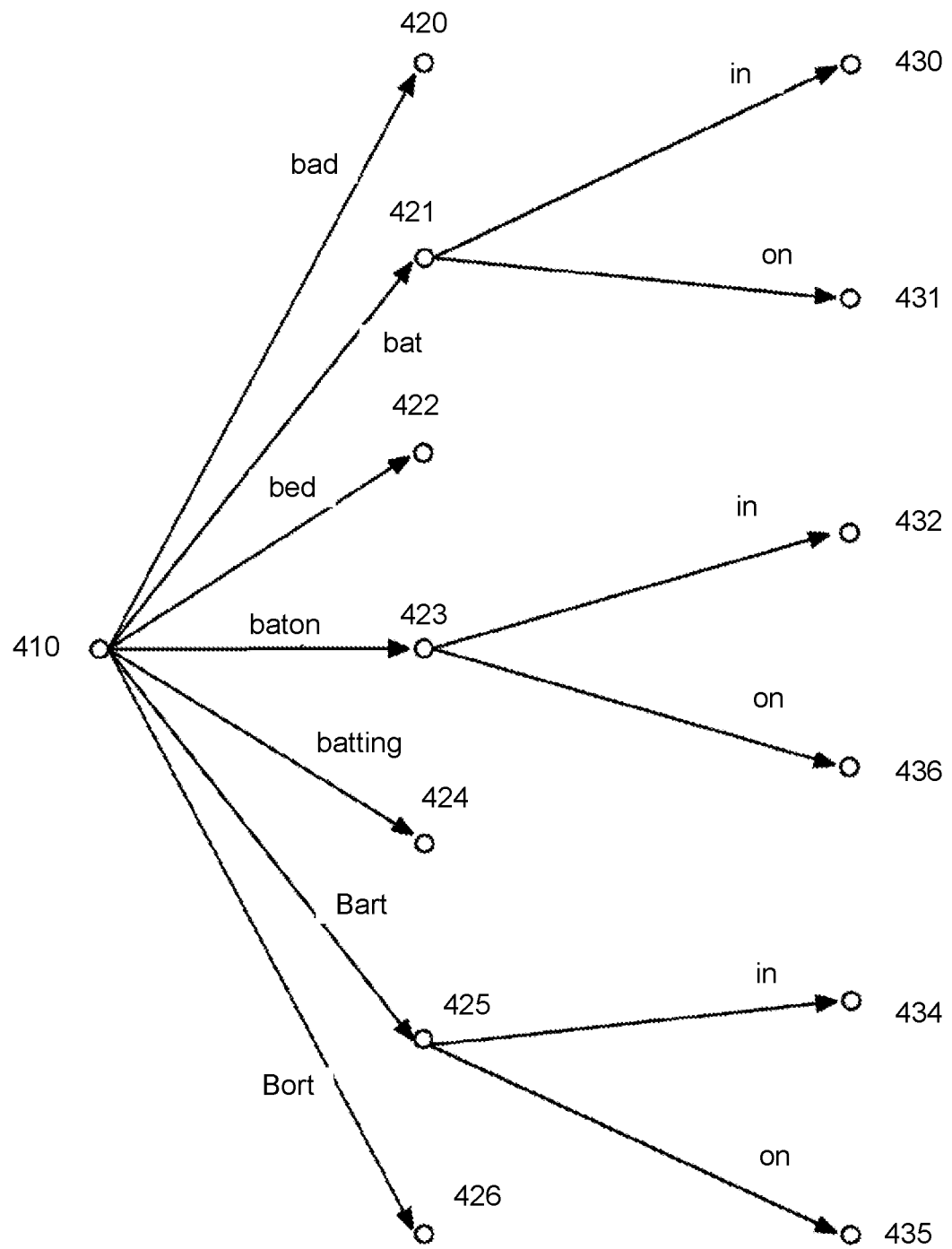
FIG. 4 illustrates a word result network, according to embodiments of the present disclosure.

As the speech recognition engine 358 determines potential words from the input audio data, the lattice may become very large as many potential sounds and words are considered as potential matches for the input audio data. The potential matches may be illustrated as a word result network representing possible sequences of words that may be recognized and the likelihood of each sequence. FIG. 4 shows an example of a word result network that may be used by the speech recognition engine 358 for recognizing speech according to some aspects of the present disclosure. A word result network may consist of sequences of words that may be recognized and the likelihood of each sequence. The likelihood of any path in the word result network may be determined by an acoustic model 353 and a language model 354. In FIG. 4, the paths shown include, for example, "bad", "bat in", "bat on", "bed", "baton in", "baton on", "batting", "Bart in", "Bart on", and "Bort".

As illustrated in FIG. 4, a word result network may start at initial node 410. At node 410, no words may have been recognized yet as the speech recognition engine 358 commences its processing. From node 410, the speech recognition engine 358 may create arcs and additional nodes where each arc may be associated with a potential word that may be recognized. In some applications, words may be represented by nodes instead of arcs. In FIG. 4, arcs from node 410 to nodes 420 to 426 are labeled with example words that may be recognized by the speech recognition engine 358.

From initial node 410, the speech recognition engine 358 may apply acoustic models 353 and language models 3 to determine which of the arcs leaving node 410 are most likely to occur. For an acoustic model 353 employing HMMs, the speech recognition engine 358 may create a separate HMM for each arc leaving node 410. Applying the acoustic model 353 and language model 354, the speech recognition engine 358 may decide to pursue some subset of the arcs leaving node 410. For example, in FIG. 4, the speech recognition engine 358 may decide to follow the paths starting with "bad", "bat", and "bed" and may decide to stop pursuing the paths starting with "baton", "batting", "Bart," and "Bort" based on the respective scores of those arcs, with the speech recognition engine 358 pursuing only the higher scoring arcs in an effort to concentrate computing resources on the arcs most likely to result in a correct result.

The speech recognition engine 358 may return an N-best list of paths along with their respective recognition scores, corresponding to the top N paths as determined by the speech recognition engine 358. Each path may correspond to a different ASR hypothesis.

Referring back to FIG. 2, the device 110b may receive a typed natural language input. The device 110b may generate text data 213 representing the typed natural language input. The device 110b may send the text data 213 to the system 120, where the text data 213 is received by the orchestrator component 230.

The orchestrator component 230 may send text data (e.g., one or more ASR hypotheses output by the ASR component 250, or the received text data 213) to an NLU component 260.

Figure 5:
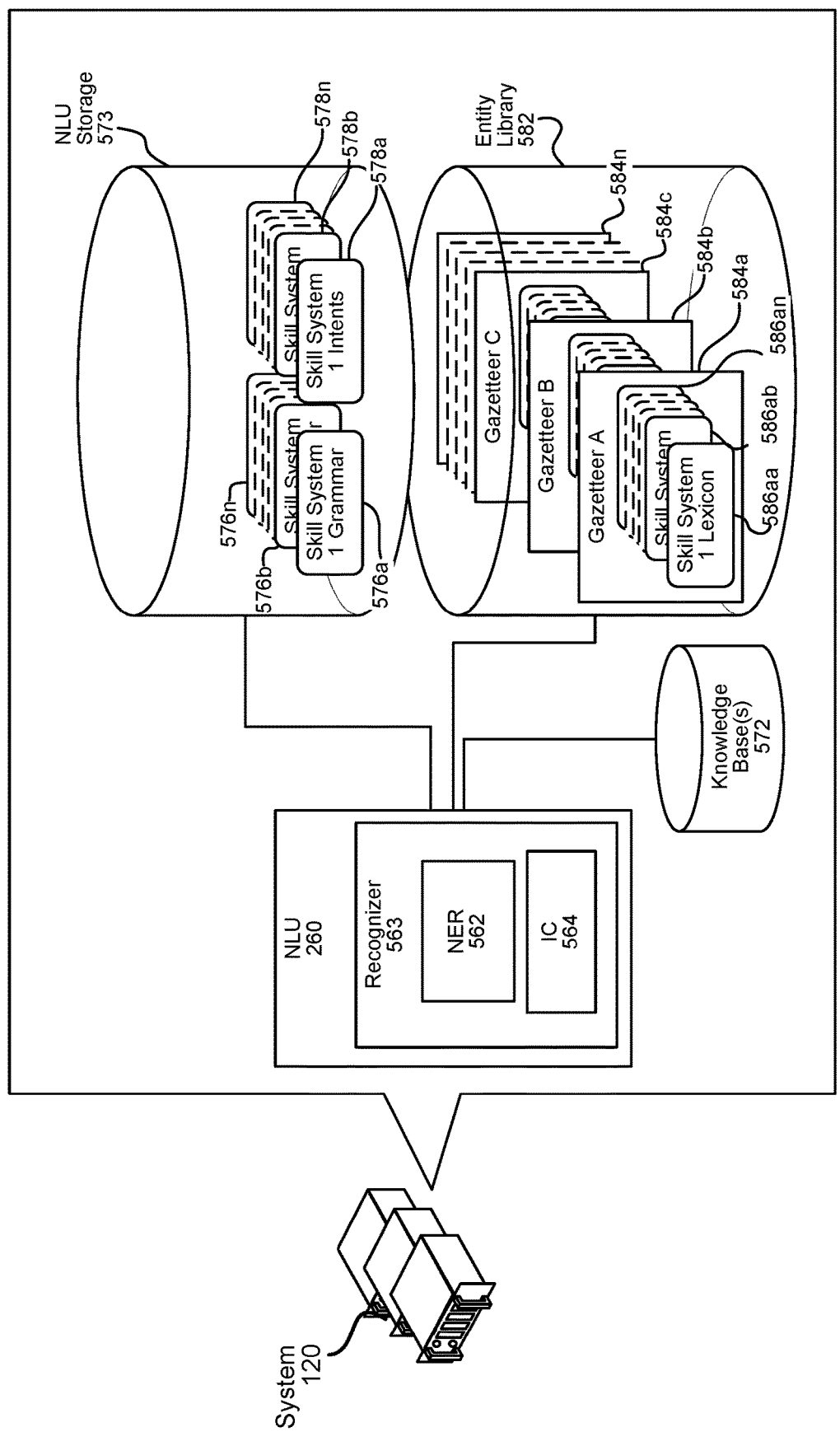
FIG. 5 is a conceptual diagram of how natural language processing is performed, according to embodiments of the present disclosure.
Figure 6:
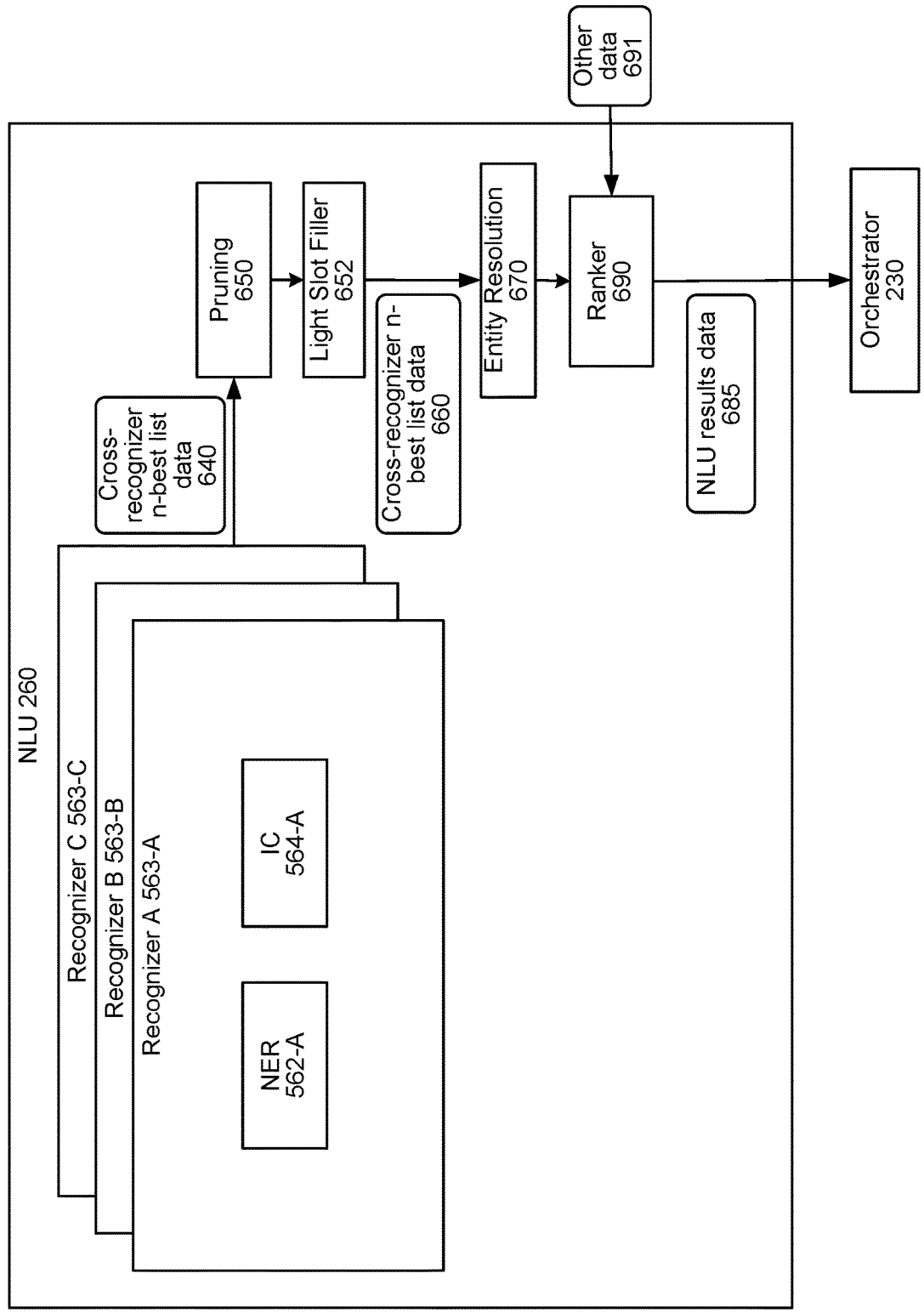
FIG. 6 is a conceptual diagram of how natural language processing is performed, according to embodiments of the present disclosure.

FIG. 5 illustrates how the NLU component 260 may perform NLU processing. The NLU component 260 may include one or more recognizers 563. In at least some embodiments, a recognizer 563 may be associated with a skill system 125 (e.g., the recognizer may be configured to interpret text data to correspond to the skill system 125). In at least some other examples, a recognizer 563 may be associated with a domain (e.g., the recognizer may be configured to interpret text data to correspond to the domain).

Recognizers 563 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system.

The NLU component 260 may communicate with various storages. The NLU component 260 may communicate with an NLU storage 573, which includes skill system grammars (576a-576n), representing how natural language inputs may be formulated to invoke skill systems 125, and skill system intents (578a-578n) representing intents supported by respective skill systems 125.

Each recognizer 563 may be associated with a particular grammar 576, a particular intent(s) 578, and a particular personalized lexicon 586 (stored in an entity library 582). A gazetteer 584 may include skill system-indexed lexical information associated with a particular user. For example, Gazetteer A (584a) may include skill system-indexed lexical information 586aa to 586an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 563 may include a NER component 562 that attempts to identify grammars and lexical information that may be used to construe meaning with respect to text data input therein. A NER component 562 identifies portions of text data that correspond to a named entity that may be recognizable by the system 120. A NER component 562 may also determine whether a word refers to an entity that is not explicitly mentioned in the text, for example "him," "her," "it" or other anaphora, exophora or the like.

A NER component 562 applies grammar models 576 and lexical information 586 associated with one or more skill systems 125 to determine a mention of one or more entities in text data input therein. In this manner, a NER component 562 identifies "slots" (i.e., particular words in text data) that may be needed for later processing. A NER component 562 may also label each slot with a type (e.g., noun, place, city, artist name, song name, etc.).

Each grammar model 576 may include the names of entities (i.e., nouns) commonly found in speech about a particular skill system 125 to which the grammar model 576 relates, whereas lexical information 586 may be personalized to the user identifier output by a user recognition component 295 for the natural language input. For example, a grammar model 576 associated with a shopping skill system may include a database of words commonly used when people discuss shopping.

A downstream process called named entity resolution actually links a portion of text data (identified by a NER component 562) to a specific entity known to the system 120. To perform named entity resolution, the NLU component 260 may use gazetteer information (584a-584n) stored in the entity library storage 582. The gazetteer information 584 may be used to match text data (identified by a NER component 562) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 563 may also include an IC component 564 that processes text data input thereto to determine an intent(s) of a skill system(s) 125 that potentially corresponds to the natural language input represented in the text data. An intent corresponds to an action to be performed that is responsive to the natural language input represented by the text data. An IC component 564 may communicate with a database 578 of words linked to intents. For example, a music intent database may link words and phrases such as "quiet," "volume off," and "mute" to a <Mute> intent. An IC component 564 identifies potential intents by comparing words and phrases in text data to the words and phrases in an intents database 578 associated with the skill system(s) 125 that is associated with the recognizer 563 implementing the IC component 564.

The intents identifiable by a specific IC component 564 may be linked to one or more skill system-specific grammar frameworks 576 with "slots" to be filled. Each slot of a grammar framework 376 corresponds to a portion of text data that a NER component 562 believes corresponds to an entity. For example, a grammar framework 576 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 576 may not be structured as sentences, but rather based on associating slots with grammatical tags.

For example, a NER component 562 may identify words in text data as subject, object, verb, preposition, etc. based on grammar rules and/or models prior to recognizing named entities in the text data. An IC component 564 (implemented by the same recognizer 563) may use the identified verb to identify an intent. The NER component 562 may then determine a grammar model 576 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 562 may then search corresponding fields in a lexicon 586, attempting to match words and phrases in the text data the NER component 562 previously tagged as a grammatical object or object modifier with those identified in the lexicon 586.

A NER component 562 may perform semantic tagging, which is the labeling of a word or combination of words according to their type/semantic meaning. A NER component 562 may parse text data using heuristic grammar rules, or a model may be constructed using techniques such as hidden Markov models, maximum entropy models, log linear models, conditional random fields (CRF), and the like. For example, a NER component 562, implemented by a music skill system or music domain recognizer 563, may parse and tag text data corresponding to "play mother's little helper by the rolling stones" as {Verb}: "Play," {Object}: "mother's little helper," {Object Preposition}: "by," and {Object Modifier}: "the rolling stones." The NER component 562 may identify "Play" as a verb based on a word database associated with the music skill system or music domain, which an IC component 564 may determine corresponds to a <PlayMusic> intent. At this stage, no determination has been made as to the meaning of "mother's little helper" and "the rolling stones," but based on grammar rules and models, the NER component 562 has determined that the text of these phrases relates to the grammatical object (i.e., entity).

The frameworks linked to the intent are then used to determine what database fields should be searched to determine the meaning of these phrases, such as searching a user's gazetteer 584 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 584 does not resolve a slot/field using gazetteer information, the NER component 562 may search a database of generic words (in the knowledge base 572). For example, if the text data corresponds to "play songs by the rolling stones," after failing to determine an album name or song name called "songs" by "the rolling stones," the NER component 562 may search a music skill system vocabulary for the word "songs." In the alternative, generic words may be checked before the gazetteer information, or both may be tried, potentially producing two different results.

A recognizer 563 may tag text data to attribute meaning thereto. For example, a recognizer 563 may tag "play mother's little helper by the rolling stones" as: {skill system} Music, {intent} Play Music, {artist name} rolling stones, {media type} SONG, and {song title} mother's little helper. For further example, a recognizer 563 may tag "play songs by the rolling stones" as: {skill system} Music, {intent} Play Music, {artist name} rolling stones, and {media type} SONG.

As described above, more than one recognizer 563 may process with respect to text data representing a single natural language input. In such instances, each recognizer 563 may output at least one NLU hypothesis including an intent indicator (determined by an IC component 564 of the recognizer 563) and at least one tagged named entity (determined by a NER component 562 of the recognizer 563).

The NLU component 260 may compile the NLU hypotheses (output by multiple recognizers 563) into cross-recognizer N-best list data 640. Each NLU hypothesis may be associated with a respective score indicating a likelihood that the NLU hypothesis corresponds to the domain, one or more skill systems 125, etc. associated with the recognizer 563 from which the NLU hypothesis was output. For example, the cross-recognizer N-best list data 640 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface with each line of the foregoing corresponding to a different NLU hypothesis and associated score.

The NLU component 260 may send the cross-recognizer N-best list data 640 to a pruning component 650, which sorts the NLU hypotheses, represented in the cross-recognizer N-best list data 640, according to their respective scores. The pruning component 650 may then perform score thresholding with respect to the cross-recognizer N-best list data 640. For example, the pruning component 650 may select NLU hypotheses, represented in the cross-recognizer N-best list data 640, associated with scores satisfying (e.g., meeting and/or exceeding) a threshold score. The pruning component 650 may additionally or alternatively perform number of NLU hypothesis thresholding. For example, the pruning component 650 may select a threshold number of top-scoring NLU hypotheses represented in the cross-recognizer N-best list data 640.

The pruning component 650 may generate cross-recognizer N-best list data 660 including the selected NLU hypotheses. The purpose of the pruning component 450 is to create a reduced list of NLU hypotheses so that downstream, more resource intensive, processes may only operate on NLU hypotheses that most likely represent the natural language input.

The NLU component 260 may include a light slot filler component 652 that takes text from slots, represented in the NLU hypotheses output by the pruning component 650, and alter it to make the text more easily processed by downstream components. The light slot filler component 652 may perform low latency operations that do not involve heavy operations such as reference to a knowledge base. The purpose of the light slot filler component 652 is to replace words with other words or values that may be more easily understood by downstream components. For example, if a NLU hypothesis includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the cross-recognizer N-best list data 660.

The cross-recognizer N-best list data 660 may be sent to an entity resolution component 670. The entity resolution component 670 can apply rules or other instructions to standardize labels or tokens in the NLU hypotheses represented in the cross-recognizer N-best list data 660. The precise transformation may depend on the skill system 125, domain, etc. to which a NLU hypothesis relates. For example, for a travel skill system-specific NLU hypothesis, the entity resolution component 670 may transform text corresponding to "Boston airport" to the standard BOS three-letter code referring to the airport. The entity resolution component 670 can refer to a knowledge base that is used to specifically identify the precise entity referred to in each slot of each NLU hypothesis represented in the cross-recognizer N-best list data 660.

Specific intent/slot combinations may also be tied to a particular source, which may then be used to resolve the text. In the example "play songs by the stones," the entity resolution component 670 may reference a personal music catalog, Amazon Music account, a user profile, or the like. The entity resolution component 670 may output N-best list data, altered from the cross-recognizer N-best list data 660, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 670 that are each specific to one or more different skill systems 125, domains, etc.

The entity resolution component 670 may not be successful in resolving every entity and filling every slot represented in the NLU hypotheses represented in the cross-recognizer N-best list data 660. This may result in the entity resolution component 670 outputting incomplete results.

The NLU component 260 may include a ranker component 690 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 690 may assign the first NLU hypothesis a higher score than a second NLU hypothesis including at least one slot that is unfilled/unresolved by the entity resolution component 670.

The ranker component 690 may apply re-scoring, biasing, or other techniques. To do so, the ranker component 690 may consider not only the data output by the entity resolution component 670, but may also consider other data 691. The other data 691 may include a variety of information.

For example, the other data 691 may include skill system 125 rating or popularity data. For example, if a skill system 125 has a high rating, the ranker component 690 may increase the score of a NLU hypothesis associated with that skill system 125, and vice versa.

The other data 691 may additionally or alternatively include information about skill systems 125 that have been enabled by the user that originated the natural language input. For example, the ranker component 690 may assign higher scores to NLU hypotheses associated with enabled skill systems 125 than NLU hypotheses associated with skill systems 125 that have not been enabled by the user.

The other data 691 may additionally or alternatively include data indicating system usage history (e.g., specific to the user), such as if the user, that originated the natural language input, regularly invokes a particular skill system 125 or does so at particular times of day. The other data 691 may additionally or alternatively include data indicating date, time, location, weather, type of device 110, user identifier, context, as well as other information. For example, the ranker component 690 may consider when any particular skill system 125 is currently active with respect to the present user and/or device 110 (e.g., music being output by the skill system 125, a game being executed by the skill system 125, etc.).

The ranker component 690 may output NLU results data 485 including one or more NLU hypotheses. The NLU component 260 may send the NLU results data 285 to the orchestrator component 230.

As described above, the system 120 may perform speech processing using two different components (e.g., the ASR component 250 and the NLU component 260). One skilled in the art will appreciate that the system 120, in at least some embodiments, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs a most likely NLU hypothesis, or multiple NLU hypotheses in the form of a lattice or an N-best list with individual NLU hypotheses corresponding to confidence scores or other scores (such as probability scores, etc.).

Referring again to FIG. 2, after receiving the NLU results data 685, the orchestrator component 230 may send the NLU results data 485 to a skill system 125. The system 120 may communicate with a variety of skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include a user recognition component 295. In at least some embodiments, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the system 120 and/or other systems.

The system 120 may include profile storage 270. The profile storage 270 may include a variety of information related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the system 120 with permission to allow the skill system 125 to execute with respect to the user's natural language inputs. If a user does not enable a skill system 125, the system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

The system 120 may also include an alternate hypothesis component 265 and data structure storage 275, both of which are described in further detail below. While the alternate hypothesis component 265 is illustrated as being a standalone component of the system 120, the alternate hypothesis component 265 may be implemented as a subcomponent of a standalone component of the system 120. For example, the alternate hypothesis component 265 may be implemented as a subcomponent of the NLU component 260.

Figure 7:
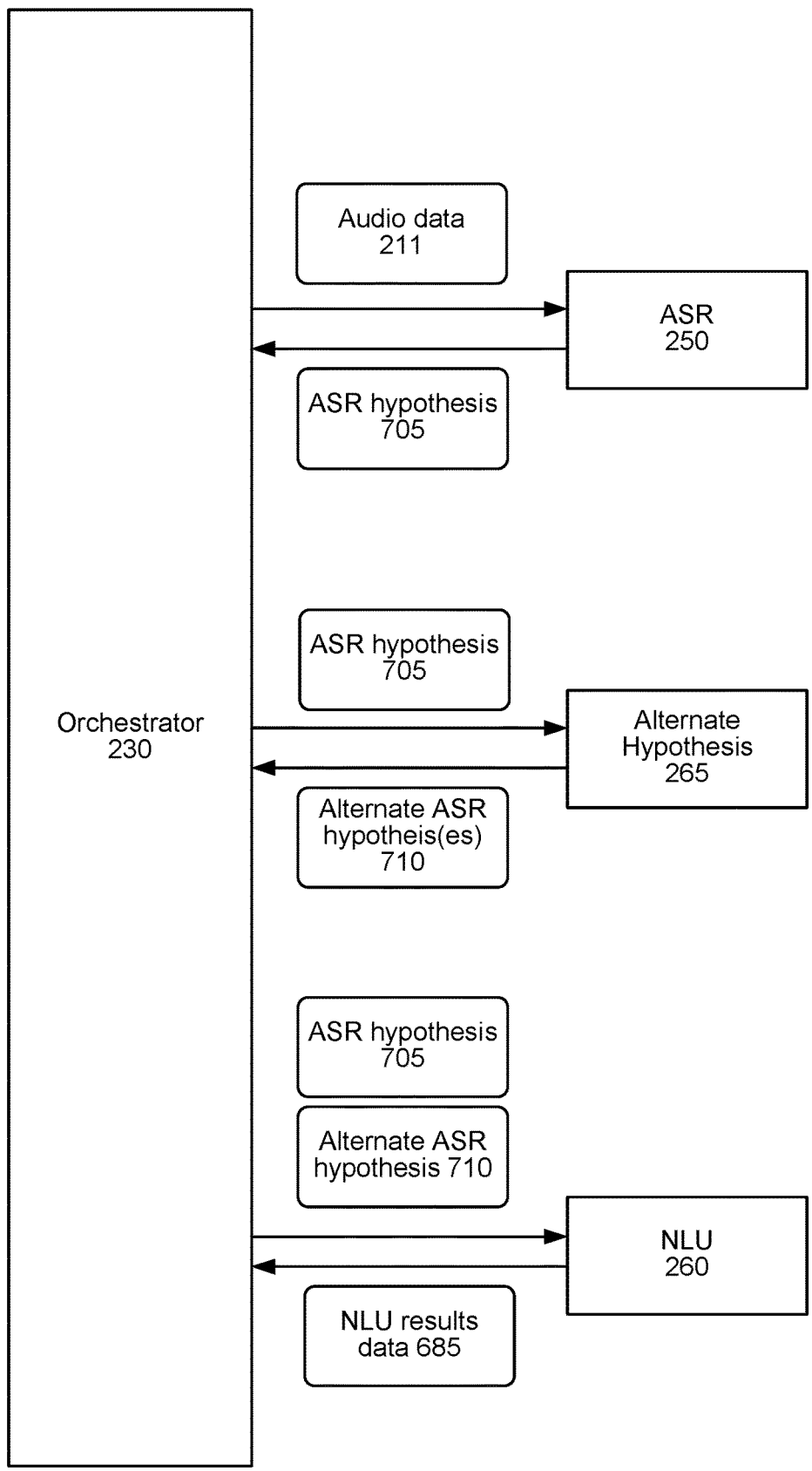
FIG. 7 is a conceptual diagram illustrating how a spoken natural language input may be processed at runtime, according to embodiments of the present disclosure.

FIG. 7 conceptually illustrates how a spoken natural language input may be processed at runtime. After the orchestrator component 230 receives the audio data 211 corresponding to a spoken natural language input, the orchestrator component 230 may send the audio data 211 to the ASR component 250. The ASR component 250 may transcribe the audio data 211 into one or more ASR hypotheses, and output one or more of the ASR hypotheses to the orchestrator component 230. For illustration, FIG. 7 shows the ASR component 250 sending a single ASR hypothesis 705 to the orchestrator component 230.

The orchestrator component 230 may send the ASR hypothesis 705 to the alternate hypothesis component 265. The alternate hypothesis component 265 may process the ASR hypothesis 705 to determine a rephrase of the ASR hypothesis 705. In at least some embodiments, the orchestrator component 230 may send, to the alternate hypothesis component 265, each ASR hypothesis the orchestrator component 230 receives from the ASR component 250. Alternatively, the orchestrator component 230 may send, to the alternate hypothesis component 265, only a subset of the ASR hypotheses the orchestrator component 230 receives from the ASR component 250. For example, the orchestrator component 230 may only send, to the alternate hypothesis component 265, ASR hypotheses associated with ASR processing confidence scores that fail to satisfy a threshold ASR processing confidence score. Such may limit the processing of the alternate hypothesis component 265 with respect to only ASR hypotheses that may result in downstream errors (e.g., the generation of incorrect NLU hypotheses, the performance of incorrect actions by skill systems 125, etc.).

The alternate hypothesis component 265 may implement one or more different data search techniques to determine alternate ASR hypotheses. For example, the alternate hypothesis component 265 may process the ASR hypothesis 705 with respect to a data structure (described in further detail herein) to determine an alternate ASR hypothesis that corresponds to the ASR hypothesis 705 but that is similar to a previous rephrase of the ASR hypothesis 705 that resulted in a skill system 125 performing a correct action. The alternate hypothesis component 265 outputs an alternate ASR hypothesis(es) 710.

In at least some embodiments, the orchestrator component 230 may send the alternate ASR hypothesis(es) 710, but not the ASR hypothesis 705, to the NLU component 260. In at least some other embodiments, the orchestrator component 230 may send the alternate ASR hypothesis(es) 710 and the ASR hypothesis 705 to the NLU component 260. In at least some other embodiments, the orchestrator component 230 may send the ASR hypothesis 705, but not the alternate ASR hypothesis(es) 710, to the NLU component 260 (e.g., in the situation where the orchestrator component 230 determines the alternate ASR hypothesis(es) 710 is associated with a score(s) that fails to satisfy a threshold score, thereby representing the system 120 is not confident enough that the alternate ASR hypothesis(es) 710 is a correct rephrase of the NLU hypothesis 705). The NLU component 260 may process with respect to the ASR hypothesis 705 and/or the alternate ASR hypothesis(es) 710. As described above, the NLU component 260 may rank NLU hypotheses generated thereby. One skilled in the art will thus appreciated that, when the NLU component 260 processes with respect to both the ASR hypothesis 705 and the alternate ASR hypothesis(es) 710, respective NLU hypotheses may be generated, and the NLU component 260 may select a best of the generated NLU hypotheses for further processing.

The NLU component 260 sends the NLU results data 685 to the orchestrator component 230. While not illustrated in FIG. 7, the orchestrator component 230 may send a NLU hypothesis to an appropriate skill system 125 for processing and execution of a corresponding action.

In situations where data structures (illustrated in FIG. 9B and described in detail below) are implemented, the alternate hypothesis component 265 may output a NLU hypotheis(es), which may be included in the cross-recognizer n-best list data 640. In at least some examples, an alternate ASR hypothesis may be generated from a NLU hypothesis output from the alternate hypothesis component 265. The alternate ASR hypothesis may then be processed by a recognizer 563 of the NLU component 260 to generate a second NLU hypothesis, which is included in the cross-recognizer n-best list data 640. If NLU models (used to generate the NLU model in the data structure) are the same as the NLU models used to generate the second NLU hypothesis, the NLU hypothesis (output by the alternate hypothesis component 265) and the second NLU hypothesis may be the same. Conversely, if NLU models (used to generate the NLU model in the data structure) are different from the NLU models used to generate the second NLU hypothesis (e.g., due to an update in the NLU models), the NLU hypothesis (output by the alternate hypothesis component 265) and the second NLU hypothesis may be different.

Figure 8:
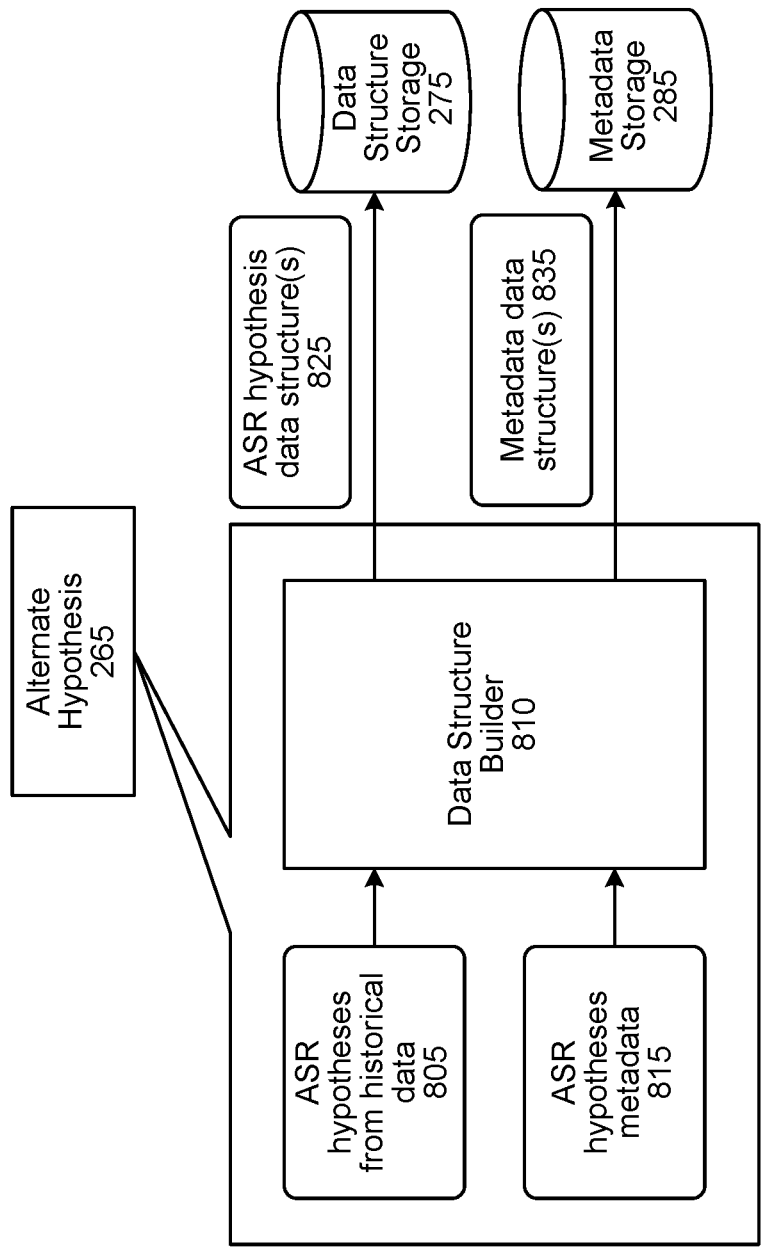
FIG. 8 is a conceptual diagram illustrating how an alternate hypothesis component may generate one or more data structures for use at runtime to determine alternate ASR hypotheses, according to embodiments of the present disclosure.

With reference to FIG. 8, described is how the alternate hypothesis component 265 may generate one or more data structures for use at runtime to determine alternate ASR hypotheses. The system 120 may store historical data corresponding to previous natural language inputs that failed (e.g., resulted in an ASR hypothesis associated with an ASR confidence score that did not satisfy a threshold ASR confidence score, a NLU hypothesis associated with a NLU confidence score that did not satisfy a threshold NLU confidence score, a skill system 120 performing an incorrect action, etc.) and were corrected via user input. For example, after the system 120 outputs data in response to a natural language input, a user may provide the system 120 with one or more subsequent natural language inputs that indicate the output data was wrong (and that optionally provide clarity as to what the correct output would have been). In at least some embodiments, a subsequent natural language input may correspond to a user-provided rephrase of the original natural language input, with the rephrased natural language input being a system-understandable natural language input (e.g., one that results in an ASR hypothesis associated with an ASR confidence score that satisfies a threshold ASR confidence score, a NLU hypothesis associated with a NLU confidence score that satisfies a threshold NLU confidence score, a skill system 120 performing a correct action, etc.).

The ASR hypotheses 805 may include ASR hypotheses, corresponding to failed natural language inputs, associated with respective correctly rephrased ASR hypotheses. Thus, ASR hypotheses 805 may, in at least some embodiments, include pairings of ASR hypotheses, with each pairing including a ASR hypothesis, corresponding to a failed natural language input, and a corresponding correctly rephrased ASR hypothesis.

The data structure builder 810 may generate one or more ASR hypothesis data structures 825. The data structure builder 810 may send the ASR hypothesis data structure(s) 825 to the data structure storage 275.

The data structure builder 810 may implement one or more machine learned models to generate one or more ASR hypothesis data structures 825. The model(s) run by the data structure builder 810 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the data structure builder 810, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

An ASR hypothesis data structure 825 may include ASR hypotheses (associated with failed natural language inputs) associated with correct rephrases of the ASR hypotheses. In at least some embodiments, an ASR hypothesis data structure 825 may be configured as a mapping of ASR hypotheses (associated with failed natural language inputs) and corresponding correct rephrases of the ASR hypotheses. An example of such a data structure is illustrated in FIGS. 9A and 9B.

Figure 9A:
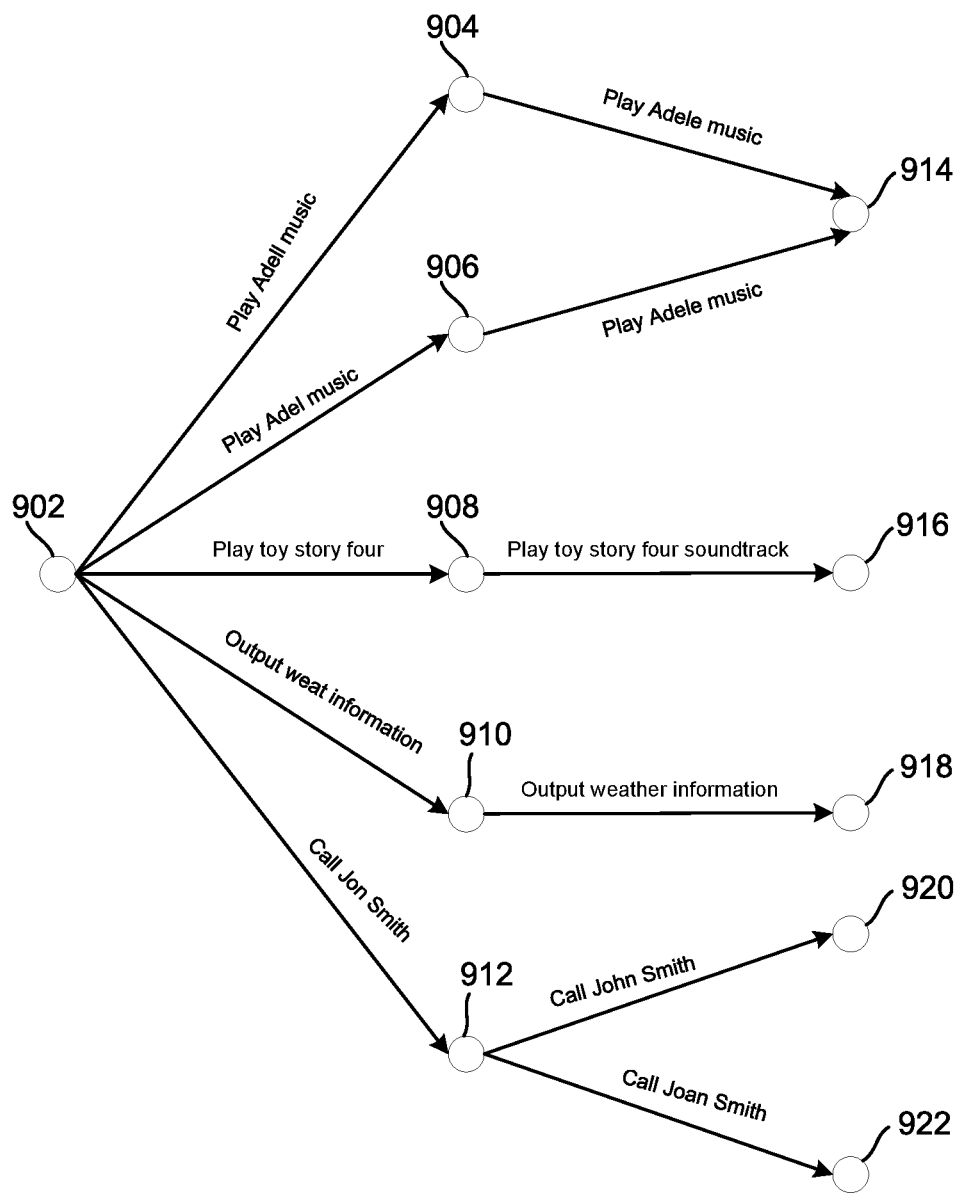
FIG. 9A illustrates an ASR hypothesis mapping, according to embodiments of the present disclosure.
Figure 9B:
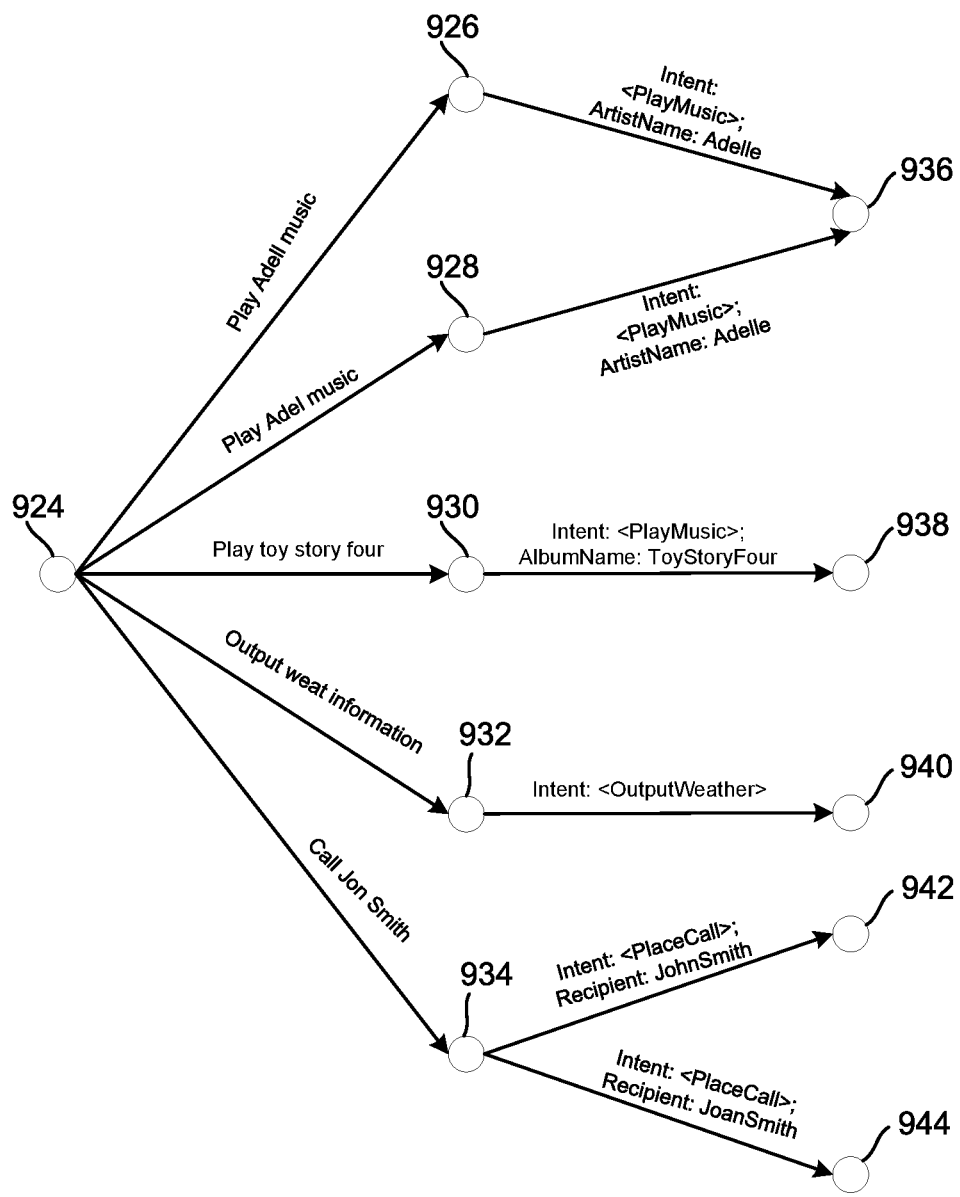
FIG. 9B illustrates a mapping of ASR hypotheses to natural language understanding (NLU) hypotheses, according to embodiments of the present disclosure.

As illustrated in FIG. 9A, an ASR hypothesis mapping may start with an initial node 902. From the initial node 902, the data structure builder 810 may create arcs and additional nodes, where each arc is associated with a different ASR hypothesis corresponding to a failed natural language input. Alternatively, in at least some embodiments, ASR hypotheses (corresponding to failed natural language inputs) may be represented as nodes instead of arcs. In FIG. 9A, arcs from the initial node 902 to nodes 904-912 are labeled with example ASR hypotheses that may correspond to failed natural language inputs.

From the nodes 904 to 912, the data structure builder 810 may create arcs to additional nodes, where each arc is associated with a different correctly rephrased ASR hypothesis. Alternatively, in at least some embodiments, correctly rephrased ASR hypotheses may be represented as nodes instead of arcs. In FIG. 9A, arcs from nodes 904-912 to nodes 914-922 are labeled with example correctly rephrased ASR hypotheses.

As illustrated in FIG. 9A, an ASR hypothesis (corresponding to a failed natural language input) may be associated with one or more correctly rephrased ASR hypotheses. Moreover, as illustrated in FIG. 9A, a correctly rephrased ASR hypothesis may be associated with one or more ASR hypotheses corresponding to failed natural language inputs.

As illustrated in FIG. 9B, an ASR hypothesis mapping may start with an initial node 924. From the initial node 924, the data structure builder 810 may create arcs and additional nodes, where an arc is associated with an ASR hypothesis corresponding to a failed natural language input, or an NLU hypothesis corresponding to a correct rephrase of the failed ASR hypothesis. Alternatively, in at least some embodiments, ASR hypotheses and NLU hypotheses may be represented as nodes instead of arcs. In FIG. 9B, arcs from the initial node 924 to nodes 926-934 are labeled with example ASR hypotheses that may correspond to failed natural language inputs.

From the nodes 926 to 934, the data structure builder 810 may create arcs to additional nodes, where each arc is associated with a different NLU hypothesis corresponding to a correct rephrasing of the ASR hypothesis from which it branches. In FIG. 9B, arcs from nodes 926-934 to nodes 936-944 are labeled with example NLU hypotheses.

As illustrated in FIG. 9B, an ASR hypothesis (corresponding to a failed natural language input) may be associated with one or more NLU hypothesis. Moreover, as illustrated in FIG. 9B, a NLU hypothesis may be associated with one or more ASR hypotheses.

Referring back to FIG. 8, the data structure builder 810 may generate more than one ASR hypothesis data structure 825. As described herein, the alternate hypothesis component 265 use more than one data search technique to determine alternate hypotheses. In at least some embodiments, the data structure builder 810 may generate a different ASR hypothesis data structure for each data search technique implemented by the alternate hypothesis component 265. For example, the data structure builder 810 may generate a first ASR hypothesis data structure that may be traversed using Lucene searching, may generate a second ASR hypothesis data structure that may be traversed using deep neural network (DNN) searching, may generate a third ASR hypothesis data structure that may be traversed using convolutional neural network (CNN) searching, may generate a fourth ASR hypothesis data structure that may be traversed using elastic searching, etc. Techniques for generating data structures for traversal using different data search techniques are known to one skilled in the art.

In at least some embodiments, the data structure builder 810 may use negative samples to generate at least a portion of an ASR hypothesis data structure 825. A negative sample may refer to an alternate ASR hypothesis that is purposely rephrased incorrectly by the data structure builder 810. For example, the data structure builder 810 may generate an alternate ASR hypothesis by replacing a song name, artist name, or other word(s) in a correct alternate ASR hypothesis with a word(s) that is known to be an incorrect rephrase of a corresponding ASR hypothesis.

The data structure builder 810 may also receive ASR hypotheses metadata 815 corresponding to the received ASR hypotheses 805. The metadata 815, associated with a single ASR hypothesis 805, may represent various context data including, for example, a time of day when the natural language input (corresponding to the ASR hypothesis 805) was received, a location of the device 110 that captured the natural language input, input/output capabilities of the device 110 that captured the natural language input, a user identifier corresponding to the user that provided the natural language input, a state of a dialog when the natural language input was received, etc.

As used herein, a "dialog" may refer to data transmissions (relating to multiple natural language inputs and system 120 outputs) between the system 120 and a device(s) 110 that all relate to a single originating natural language input. The data transmissions of a dialog may be associated with a same dialog identifier, which may be used by components of the overall system 100 to track data across the dialog. Subsequent natural language inputs of the same dialog may or may not start with the speaking of a wakeword. Each natural language input of a dialog may be associated with a different natural language input identifier such that multiple natural language input identifiers may be associated with a single dialog identifier.

The data structure builder 810 may receive different metadata, associated with a single ASR hypothesis (corresponding to a failed natural language input), from multiple sources. The data structure builder 810 may generate a metadata data structure(s) 835 wherein various metadata (received from multiple sources) is associated with an appropriate ASR hypothesis. The data structure builder 810 may send the metadata structure(s) 835 to a metadata storage 285.

Figure 10:
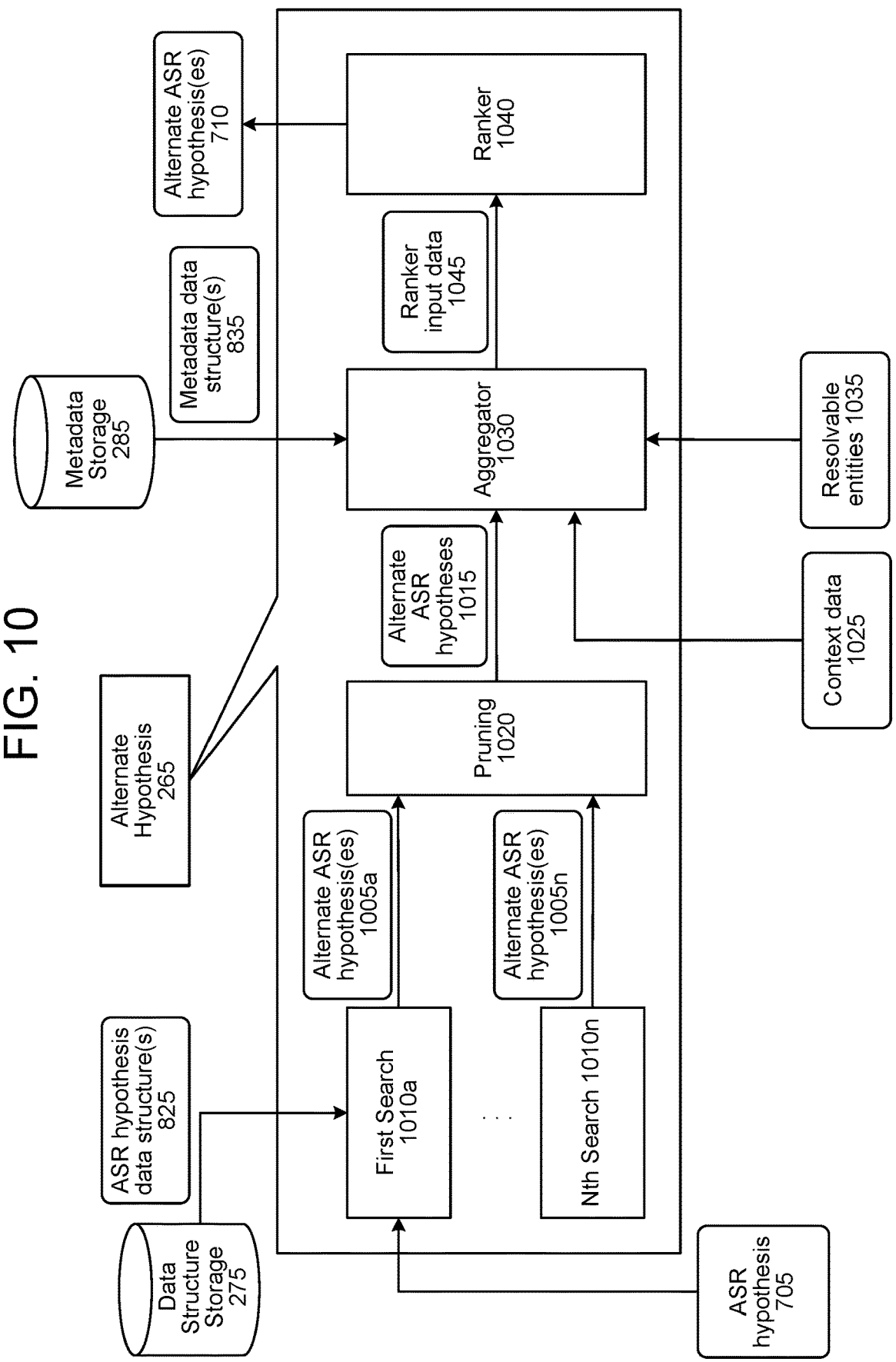
FIG. 10 is a conceptual diagram illustrating how the alternate hypothesis component may determine at least one alternate ASR hypothesis at runtime, according to embodiments of the present disclosure.

Attention is now given to FIG. 10, which illustrates runtime processing of the alternate hypothesis component 265. The alternate hypothesis component 265 may receive an ASR hypothesis 705 output from the ASR component 250 (or a top-scoring ASR hypothesis 705 in the situation where the ASR component 250 outputs multiple ASR hypotheses). In the alternate hypothesis component 265, the ASR hypothesis 705 may be sent to various search components (1010*a*-1010*n*). The various search components 1010 may generally be configured for recall purposes (i.e., to determine as many relevant alternate ASR hypotheses as possible).

Various different types of search components 1010 may be implemented with respect to the ASR hypothesis 705. Illustrative, non-limiting examples of search components that may be implemented include a DNN search component, a CNN search component, a Lucene search component, an elastic search component, and a long short-term memory (LSTM) search component. One skilled in the art will appreciate that running various different search components (implementing different search techniques) enables better alternate ASR hypothesis recall (e.g., enables determination of more possible alternate ASR hypotheses) than running a single search technique.

A search component 1010 may receive a corresponding ASR hypothesis data structure 825 from the data structure storage 275. For example, a DNN search component may receive, from the data structure storage 275, an ASR hypothesis data structure capable of being searched using a DNN model. For further example, a CNN search component may receive, from the data structure storage 275, an ASR hypothesis data structure capable of being searched using a CNN model. In another example, a Lucene search component may receive, from the data structure storage 275, an ASR hypothesis data structure capable of being searched using a Lucene model. In a further example, an elastic search component may receive, from the data structure storage 275, an ASR hypothesis data structure capable of being searched using an elastic search model. In another example, a LSTM search component may receive, from the data structure storage 275, an ASR hypothesis data structure capable of being searched using a LSTM model.

Figure 11:
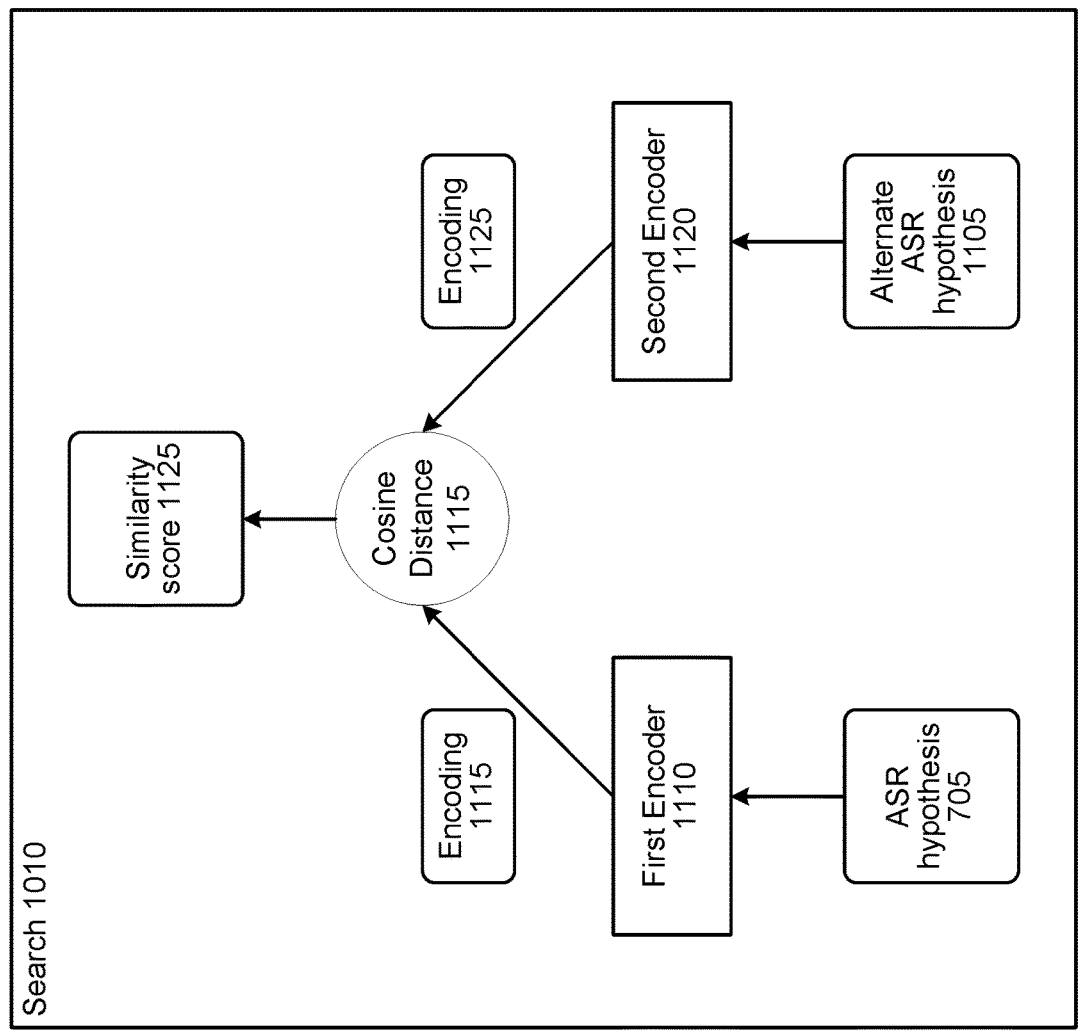
FIG. 11 is a conceptual diagram illustrating how a search component, of the alternate hypothesis component, may determine a similarity score for an alternate ASR hypothesis, according to embodiments of the present disclosure.

A search component 1010 may be configured to find, in a respective ASR hypothesis data structure received from the data structure storage 275, one or more paths (from the ASR hypothesis 705 to an associated alternate ASR hypothesis) having the highest likelihood of success (e.g., having a highest similarity score). FIG. 11 illustrates how a search component 1010 may determine a similarly score for an alternate ASR hypothesis represented in an ASR hypothesis data structure received from the data structure storage 275.

As illustrated in FIG. 11, a search component 1010 may implement a first encoder 1110 and a second encoder 1120. The first encoder 1110 may encode the ASR hypothesis 705. The second encoder 1120 may encode an alternate ASR hypothesis 1105 represented in an ASR hypothesis data structure 825 received by the search component 1010 from the data structure storage 275. The first encoder 1110 and the second encoder 1120 may be any type of encoder, provided that the first encoder 1110 and the second encoder 1120 are the same type of encoder. Illustrative, non-limiting types of encoders include deep averaging network, CNN, LSTM, and transformer. The first encoder 1110 and the second encoder 1120 may be trained using art known and not yet discovered techniques.

The ASR hypothesis 705, input to the first encoder 1110, may be represented in various forms. For example, the ASR hypothesis 705 may be represented as a plurality of word-unigrams, a plurality of character-unigrams, a plurality of character-trigrams, a plurality of subword-units, or a combination thereof.

The alternate ASR hypothesis 1105, represented in the ASR hypothesis data structure 825 and input into the second encoder 1120, may be represented in various forms. For example, the alternate ASR hypothesis 1105 may be represented as a plurality of word-unigrams, a plurality of character-unigrams, a plurality of character-trigrams, a plurality of subword-units, or a combination thereof.

The first encoder 1110 may generate an encoding 1115 of the ASR hypothesis 705. The second encoder 1120 may generate an encoding 1125 of the alternate ASR hypothesis 1105. In at least some examples, a search component 1010 may include a single encoder that encodes the ASR hypothesis 705 into the encoding 1115, and encodes the alternate ASR hypothesis 1105 into the encoding 1125.

The search component 1010 may determine a cosine distance 1115 between the encodings 1115/1125. The search component 1010 may use art known means to determine the cosine distance 1115.

The search component 1010 may determine a similarity score 1125 (between the ASR hypothesis 705 and the alternate ASR hypothesis 1105) based on the cosine distance 1115. The search component 1010 may use art known means to determine the similarity score 1125. The similarity score 1125 may be computed within a range (e.g., from 0 to 1, 0 to 10, 0 to 100, or some other range of similarity scores).

A search component 1010 may generate more than one similarity score with respect to an ASR hypothesis data structure 825 received from the data structure storage 275. For example, the search component 1010 may generate a first similarity score with respect to the ASR hypothesis 705 and a first alternate ASR hypothesis represented in the ASR hypothesis data structure 825, a second similarity score with respect to the ASR hypothesis 705 and a second alternate ASR hypothesis represented in the ASR hypothesis data structure 825, etc.

Referring again to FIG. 10, each search component 1010 may output one or more alternate ASR hypotheses 1005. In at least some embodiments, a search component 1010 may output any alternate ASR hypothesis with respect to which the search component 1010 generates a similarity score satisfying a threshold similarity score. In at least some embodiments, a search component 1010 may output a maximum number of different alternate ASR hypotheses.

The alternate ASR hypotheses 1005, output from the search components (1010a-1010n) may be input to a pruning component 1020. The pruning component 1020 is configured to reduce the number of alternate ASR hypotheses 1005 processed by downstream components of the alternate hypothesis component 265.

In at least some embodiments, the pruning component 1020 may delete redundant alternate ASR hypotheses 1005 received by the pruning component 1020. Accordingly, alternate ASR hypotheses 1015, output by the pruning component 1020, may include only one instance of any particular alternate ASR hypothesis.

In at least some embodiments, the pruning component 1020 may additionally or alternatively prune received alternate ASR hypotheses 1005 based on similarity score. For example, the pruning component 1020 may output alternate ASR hypotheses 1015 associated with similarity scores satisfying a threshold similarity score.

In at least some embodiments, the pruning component 1020 may additionally or alternatively prune received alternate ASR hypotheses 1005 based on a number of alternate ASR hypotheses. For example, the pruning component 1020 output up to a threshold number of alternate ASR hypotheses 1015.

The alternate ASR hypotheses 1015, output by the pruning component 1020, may be input to an aggregator component 1030. The aggregator component 1030 may aggregate the alternate ASR hypotheses 1015, metadata, context data 1025, and entities 1035 that are resolvable by the entity resolution component 670 of the NLU component 260.

The aggregator component 1030 may receive a user identifier output from the user recognition component 295 (or a top-ranked user identifier output from the user recognition component 295 in the situation where the user recognition component 295 outputs multiple user identifiers). For each alternate ASR hypothesis 1015, the aggregator component 1030 may query the metadata storage 285 for a metadata data structure 835 representing context data associated with the alternate ASR hypothesis 1015 and the user identifier. As such, a metadata data structure 835 (received by the aggregator component 1030 for a certain alternate ASR hypothesis 1015) may represent one or more previous instances when the system 120 either received a spoken natural language input interpreted by the ASR component 250 to be represented by the alternate ASR hypothesis 1015, or previously correctly rephrased an ASR hypothesis to the alternate ASR hypothesis 1015. The context data, represented in a metadata data structure 835 received by the aggregator component 1030, may include context data such as, for example, a time of day when a natural language input (corresponding to the alternate ASR hypothesis 1015) was received, a location of the device 110 that captured the natural language input, input/output capabilities of the device 110 that captured the natural language input, a state of a dialog when the natural language input was received, etc.

The context data 1025 may represent various context data associated with the ASR hypothesis 705 input to the alternate hypothesis component 265. The context data 1025 may include context data such as, for example, a time of day when a natural language input (corresponding to the ASR hypothesis 705) was received, a location of the device 110 that captured the natural language input, input/output capabilities of the device 110 that captured the natural language input, a state of a dialog when the natural language input was received, etc.

The resolvable entities 1035 may include entities known to the system 120. The resolvable entities 1035 may correspond to different domains. For example, the resolvable entities 1035 may include artist names, song titles, album names, etc. corresponding to a music domain. For further example, the resolvable entities 1035 may include movie titles, actor names, etc. corresponding to a video domain. In at least some embodiments, the resolvable entities 1035 may be limited to entities represented in previous natural language inputs associated with the user identifier associated with the ASR hypothesis 705 (e.g., a user identifier output by the user recognition component 295 with respect to the present natural language input).

The aggregator component 1030 may, in addition to aggregating the various data described above, perform processing on the data to put the data in a format processable by a ranker component 1040 of the alternate hypothesis component 265 (illustrated as ranker input data 1045 in FIG. 10). The ranker input data 1045 may include aggregator component 1030-generated representations of the For example, the aggregator component 1030 may the ASR hypothesis 705, alternate ASR hypotheses 1015, metadata, context data 1025, and entities 1035 that are resolvable by the entity resolution component 670 of the NLU component 260.

Figure 12:
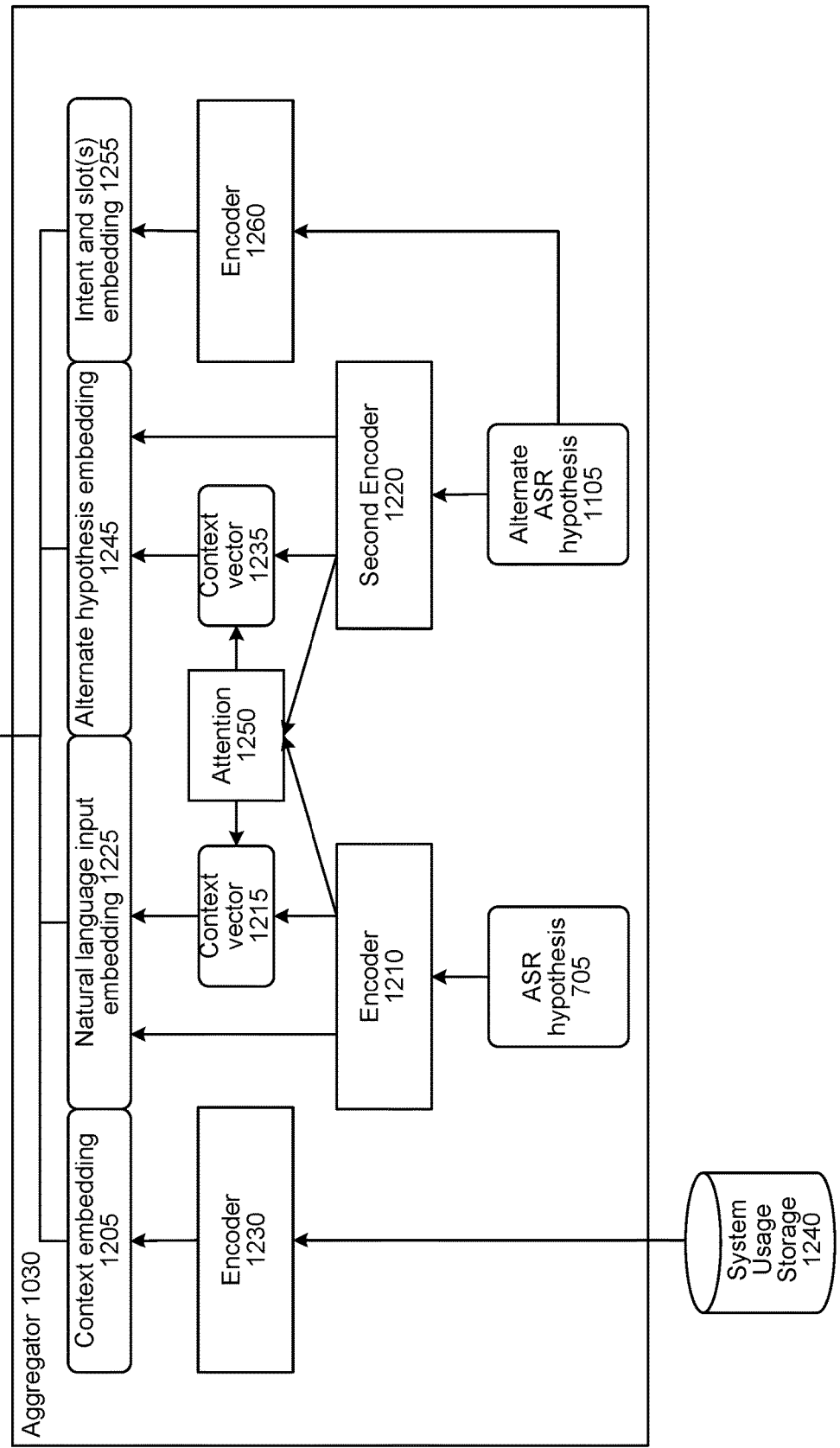
FIG. 12 conceptually illustrates how an aggregator component, of the alternate hypothesis component, may process, according to embodiments of the present disclosure.

FIG. 12 conceptually illustrates processing that may be performed by the aggregator component 1030 to generate the ranker input data 1045. The aggregator component 1030 may process the ASR hypothesis 705 using an encoder 1210 to determine an encoded feature vector representing the ASR hypothesis 705. The aggregator component 1030 may also process the alternate ASR hypothesis 1105 using an encoder 1220 to determine an encoded feature vector representing the alternate ASR hypothesis 1105. The aggregator component 1030 may additionally use an encoder 1230 to encode a past natural language input (associated with the user identifier (representing a user that most likely provided the present natural language input) received from a system usage storage 1240) to determine an encoded feature vector representing the historic natural language input provided by the user (illustrated as a context embedding 1205).

The context embedding 1205 may be processed using an attention component 1250, to attract "attention" to certain features of the past natural language input when determining a context feature vector 1215. The context feature vector 1215 may be concatenated with an encoded feature vector output from the encoder 1210 (representing the ASR hypothesis 705) to generate a natural language input embedding 1225.

In at least some embodiments, the aggregator component 1030 may process the entire ASR hypothesis 705. In at least some other embodiments, the aggregator component 1030 may process a portion of the ASR hypothesis 705, for example a portion corresponding to an entity name or slot value that may be used by the NLU component 260 to determine an appropriate action to be performed.

The context embedding 1205 may also be processed using the attention component 1250 to determine a context feature vector 1235. The context feature vector 1235 may be concatenated with an encoded feature vector output from the encoder 1220 (representing the alternate ASR hypothesis 1105) to generate an alternate hypothesis embedding 1245.

In at least some embodiments, the alternate ASR hypothesis 1105 may be associated with NLU results data representing the alternate ASR hypothesis 1105. For example, the NLU results data may include an intent representing the alternate ASR hypothesis 1105, and one or more portions representing one or more resolved entities represented in the alternate ASR hypothesis 1105. The NLU results data may be input into an encoder 1260, which generates an intent and slot(s) embedding 1255.

The context embedding 1205, the natural language input embedding 1225, the alternate hypothesis embedding 1245, and the intent and slot(s) embedding 1255 may all be included in the ranker input data 1045 input to the ranker component 1040.

The encoders 1210/1220/1230/1260 may be implemented as known in the art. Various encoders may be used. The encoders 1210/1220/1230/1260 may be configured to generate embeddings processable by the type of machine learned model implemented by the ranker component 1040.

As described above, the aggregator component 1030 may receive more than one alternate ASR hypothesis. In such situations, the aggregator component 1030 may perform the foregoing processing (described with respect to FIG. 12) for each received alternate ASR hypothesis.

Referring again to FIG. 10, the ranker component 1040 may receive the ranker input data 1045 including the various embeddings generated by the aggregator component 1030. The ranker component 1040 may implement one or more types of machine learned models to rank the alternate ASR hypotheses 1015 using the embedding represented in the ranker input data 1045. For example, the ranker component 1040 may implement a logistic regression model, a boosted gradient decision tree trained with listwise loss model, and/or other types of art known machine learned models configured to rank ASR hypotheses. In ranking the alternate ASR hypotheses 1015, the ranker component 1040 may determine, for each alternate ASR hypothesis, a score representing a confidence (or probability) that the alternate ASR hypothesis is a correct rephrase of the ASR hypothesis 705 (e.g., in view of context data).

In at least some embodiments, the alternate ASR hypothesis(es) 710, output by the ranker component 1040, may simply include a top-ranked alternate ASR hypothesis (e.g., an alternate ASR hypothesis associated with a highest score determined by the ranker component 1040). In at least some other embodiments, the alternate ASR hypothesis(es) 710 may include an N-best list of alternate ASR hypotheses, each being associated with a respective score determined by the ranker component 1040.

The above describes processing of the alternate hypothesis component 265 with respect to an ASR hypothesis 705. However, the present disclosure is not limited thereto. As described below, the alternate hypothesis component 265 may process with respect to NLU results data representing a spoken natural language input or a typed natural language input.

Figure 13:
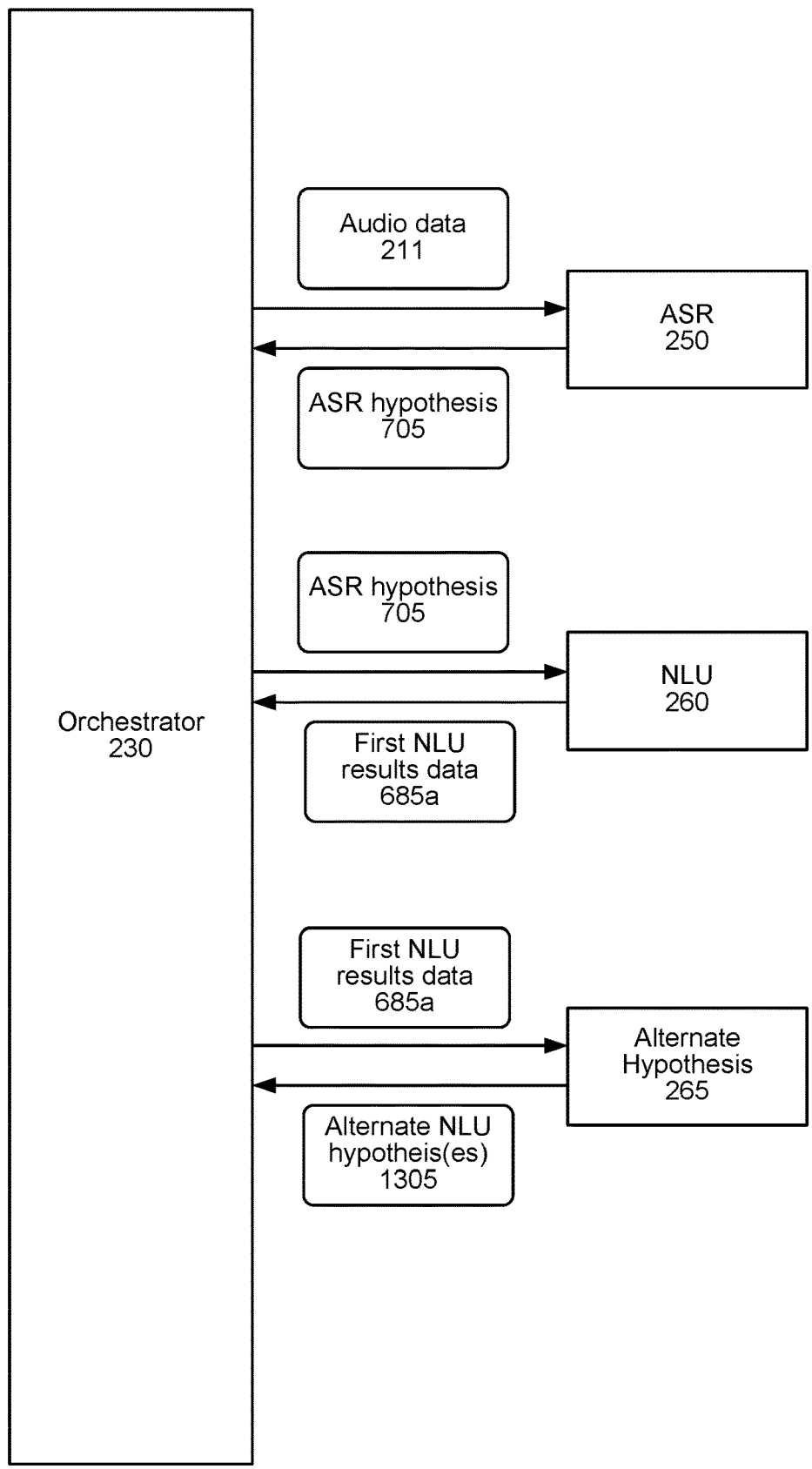
FIG. 13 is a conceptual diagram illustrating how a spoken natural language input may be processed at runtime, according to embodiments of the present disclosure.

FIG. 13 conceptually illustrates how a spoken natural language input may be processed at runtime. After the orchestrator component 230 receives the audio data 211 corresponding to a spoken natural language input, the orchestrator component 230 may send the audio data 211 to the ASR component 250. The ASR component 250 may transcribe the audio data 211 into one or more ASR hypotheses, and output one or more of the ASR hypotheses to the orchestrator component 230. For illustration, FIG. 13 shows the ASR component 250 sending a single ASR hypothesis 705 to the orchestrator component 230.

The orchestrator component 230 may send the ASR hypothesis 705 to the NLU component 260. The NLU component 260 may generate first NLU results data 685a representing the spoken natural language input.

The NLU component 260 may send the first NLU results data 685a to the orchestrator component 230. The orchestrator component 230 may send the first NLU results data 685a to the alternate hypothesis component 265. The alternate hypothesis component 265 may process the NLU hypothesis represented in the first NLU results data 685a (or a top-scoring NLU hypothesis of an N-best list of NLU hypotheses represented in the first NLU results data 685a) to determine an alternate NLU hypothesis(es) 1305, representing a re-representation of the processed NLU hypothesis.

In at least some embodiments, the orchestrator component 230 may send, to the alternate hypothesis component 265, each NLU hypothesis the orchestrator component 230 receives from the NLU component 260. Alternatively, the orchestrator component 230 may send, to the alternate hypothesis component 265, only a subset of the NLU hypotheses the orchestrator component 230 receives from the NLU component 260. For example, the orchestrator component 230 may only send, to the alternate hypothesis component 265, NLU hypotheses associated with NLU processing confidence scores that fail to satisfy a threshold NLU processing confidence score. Such may limit the processing of the alternate hypothesis component 265 with respect to only NLU hypotheses that may result in downstream errors (e.g., the performance of incorrect actions by skill systems 125, etc.).

The alternate hypothesis component 265 may send the alternate NLU hypothesis(es) 1305 to the orchestrator component 230. The orchestrator component 230 may determine a score associated with the received alternate NLU hypothesis (or associated with a top-scoring alternate NLU hypothesis received as part of an N-best list of alternate NLU hypotheses). The orchestrator component 230 may determine whether the score, associated with the alternate NLU hypothesis, is greater than the score associated with the NLU hypothesis (or top-scoring NLU hypothesis) input to the alternate hypothesis component 265. If the orchestrator component 230 determines the score, associated with the alternate NLU hypothesis, is greater than the score associated with the NLU hypothesis, the orchestrator component 230 may send the alternate NLU hypothesis, but not the NLU hypothesis, to a skill system 125 for processing. Conversely, if the orchestrator component 230 determines the score, associated with the alternate NLU hypothesis, is less than the score associated with the NLU hypothesis, the orchestrator component 230 may send the NLU hypothesis, but not the alternate NLU hypothesis, to a skill system 125 for processing.

Figure 14:
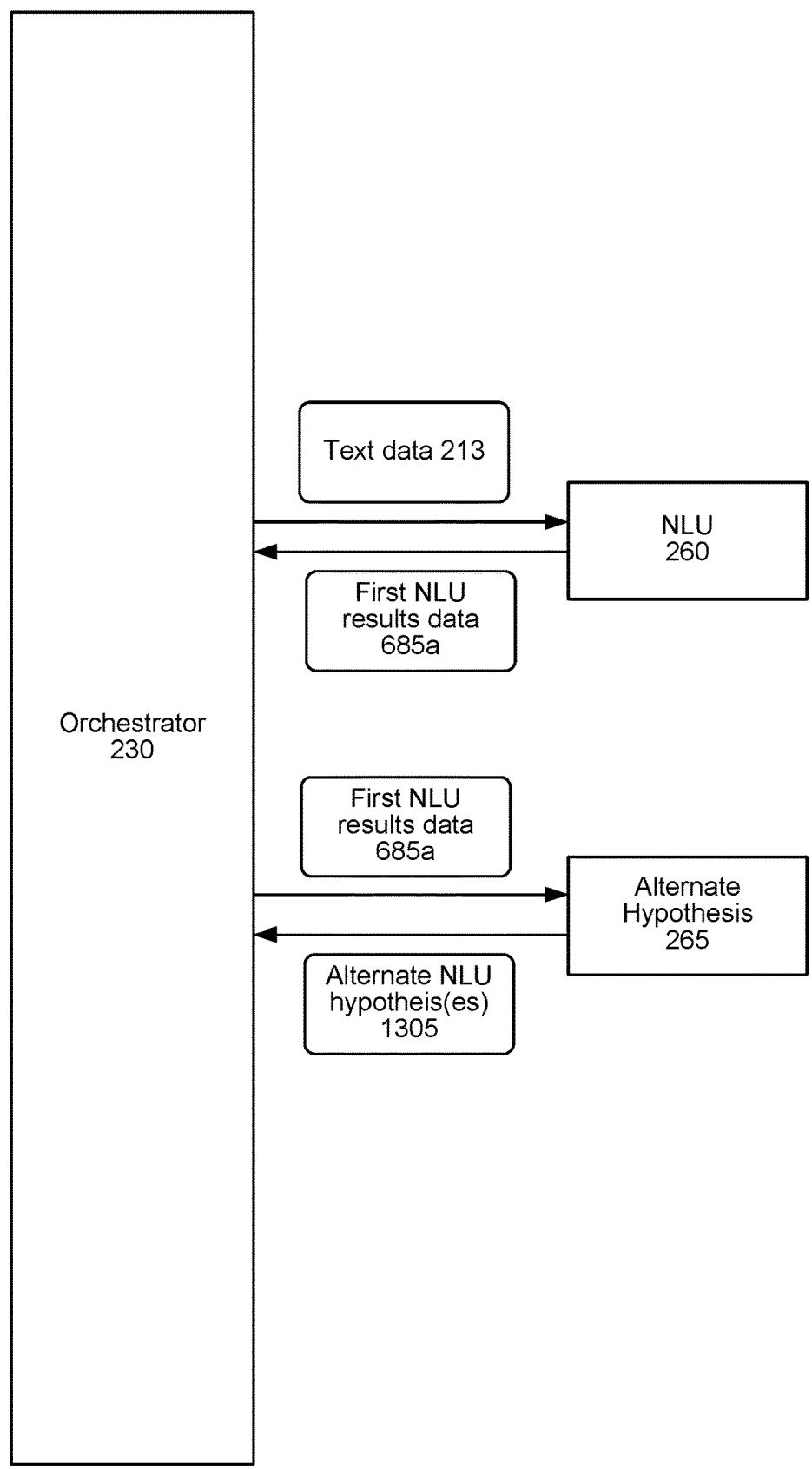
FIG. 14 is a conceptual diagram illustrating how a non-spoken (e.g., typed) natural language input may be processed at runtime, according to embodiments of the present disclosure.

FIG. 14 conceptually illustrates how a non-spoken (e.g., typed) natural language input may be processed at runtime. After the orchestrator component 230 receives the text data 213 corresponding to a non-spoken natural language input, the orchestrator component 230 may send the text data 213 to the NLU component 260. The NLU component 260 may generate first NLU results data 685a representing the non-spoken natural language input.

The NLU component 260 may send the first NLU results data 685a to the orchestrator component 230. The orchestrator component 230 may send the first NLU results data 685a to the alternate hypothesis component 265. The alternate hypothesis component 265 may process the NLU hypothesis represented in the first NLU results data 685a (or a top-scoring NLU hypothesis of an N-best list of NLU hypotheses represented in the first NLU results data 685a) to determine an alternate NLU hypothesis(es) 1305, representing a re-representation of the processed NLU hypothesis.

In at least some embodiments, the orchestrator component 230 may send, to the alternate hypothesis component 265, each NLU hypothesis the orchestrator component 230 receives from the NLU component 260. Alternatively, the orchestrator component 230 may send, to the alternate hypothesis component 265, only a subset of the NLU hypotheses the orchestrator component 230 receives from the NLU component 260. For example, the orchestrator component 230 may only send, to the alternate hypothesis component 265, NLU hypotheses associated with NLU processing confidence scores that fail to satisfy a threshold NLU processing confidence score. Such may limit the processing of the alternate hypothesis component 265 with respect to only NLU hypotheses that may result in downstream errors (e.g., the performance of incorrect actions by skill systems 125, etc.).

The alternate hypothesis component 265 may send the alternate NLU hypothesis(es) 1305 to the orchestrator component 230. The orchestrator component 230 may determine a score associated with the received alternate NLU hypothesis (or associated with a top-scoring alternate NLU hypothesis received as part of an N-best list of alternate NLU hypotheses). The orchestrator component 230 may determine whether the score, associated with the alternate NLU hypothesis, is greater than the score associated with the NLU hypothesis (or top-scoring NLU hypothesis) input to the alternate hypothesis component 265. If the orchestrator component 230 determines the score, associated with the alternate NLU hypothesis, is greater than the score associated with the NLU hypothesis, the orchestrator component 230 may send the alternate NLU hypothesis, but not the NLU hypothesis, to a skill system 125 for processing. Conversely, if the orchestrator component 230 determines the score, associated with the alternate NLU hypothesis, is less than the score associated with the NLU hypothesis, the orchestrator component 230 may send the NLU hypothesis, but not the alternate NLU hypothesis, to a skill system 125 for processing.

The general concept of the processing performed by the alternate hypothesis component 265 to generate alternate ASR hypotheses may be applicable to the alternate hypothesis component 265's generation of alternate NLU hypotheses. The only differences may be that the ASR data stored and processed by the alternate hypothesis component 265 above may be substituted with corresponding NLU data. For example, the data structure builder 810 may generate at least one NLU hypothesis data structure(s) representing NLU hypotheses associated with corresponding re-configured NLU hypotheses. Moreover, components of the alternate hypothesis component 265 may implement different encoders depending on whether the alternate hypothesis component 265 is processed with respect to a ASR hypothesis or an NLU hypothesis. Such different encoders are within the knowledge of one skilled in the art.

Figure 15:
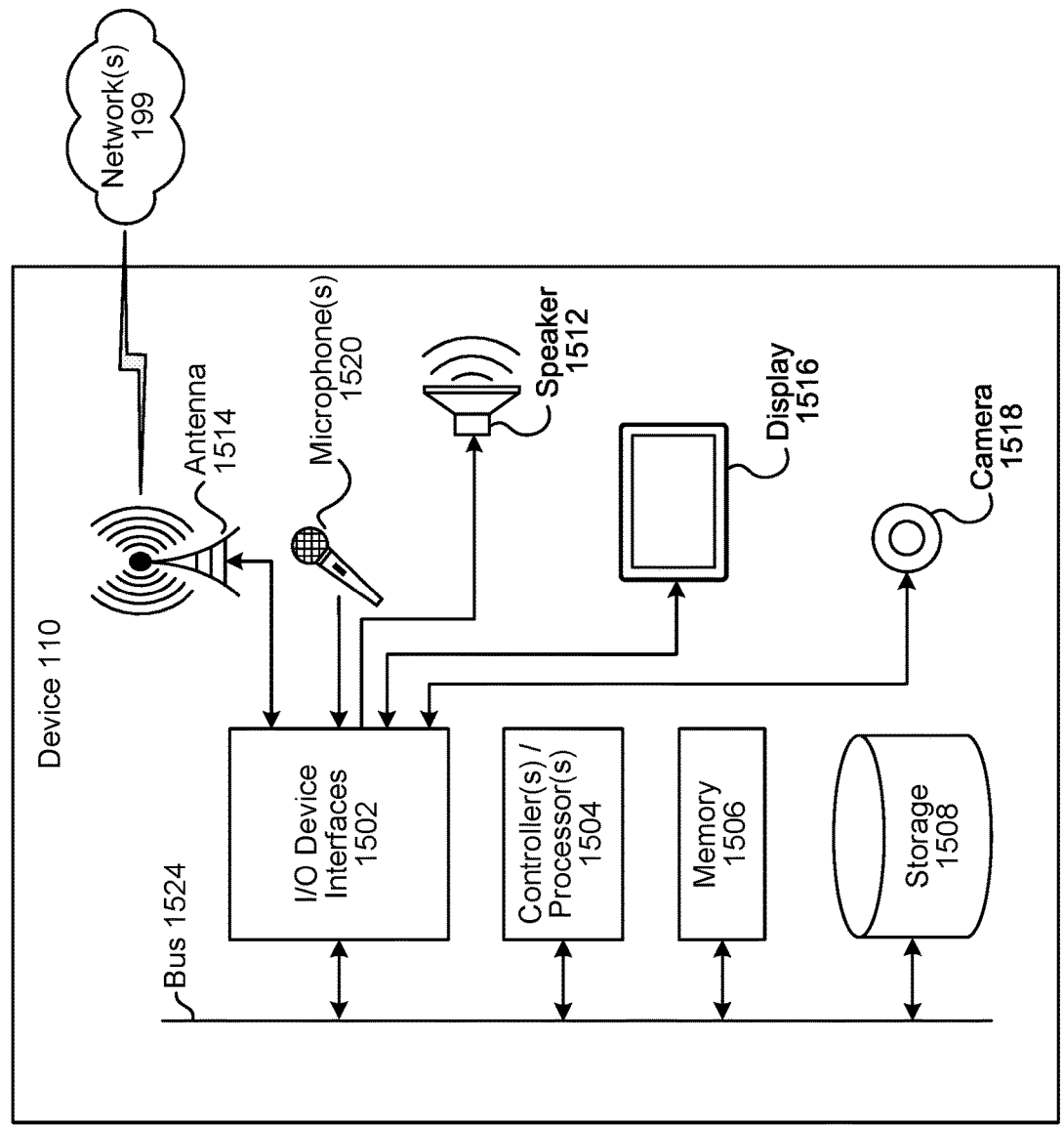
FIG. 15 is a block diagram conceptually illustrating example components of a device, according to embodiments of the present disclosure.
Figure 16:
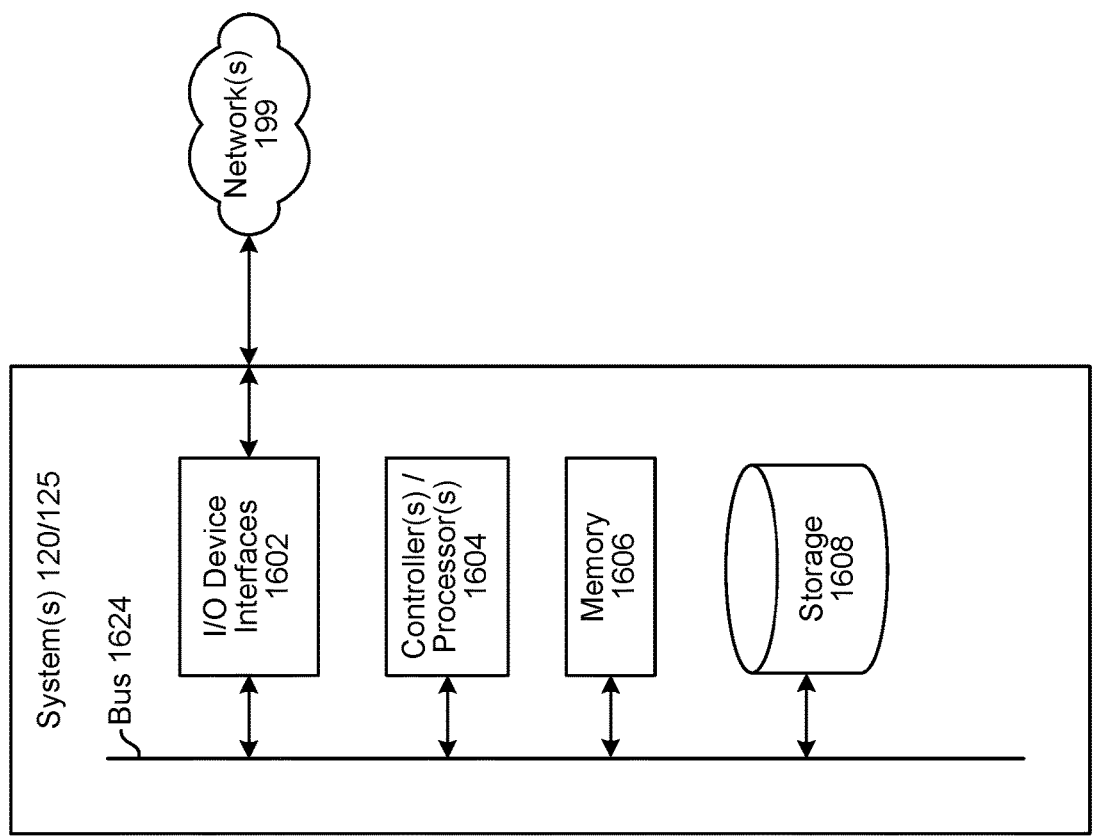
FIG. 16 is a block diagram conceptually illustrating example components of a system, according to embodiments of the present disclosure.

FIG. 15 is a block diagram conceptually illustrating a device 110 that may be used with the system. FIG. 16 is a block diagram conceptually illustrating example components of a remote device, such as the system 120, which may assist with ASR processing, NLU processing, etc.; and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1502/1602).

Computer instructions for operating each device (110/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/125) includes input/output device interfaces (1502/1602). A variety of components may be connected through the input/output device interfaces (1502/1602), as will be discussed further below. Additionally, each device (110/120/125) may include an address/data bus (1524/1624) for conveying data among components of the respective device. Each component within a device (110/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (1502/1602), processor(s) (1504/1604), memory (1506/1606), and/or storage (1508/1608) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 17:
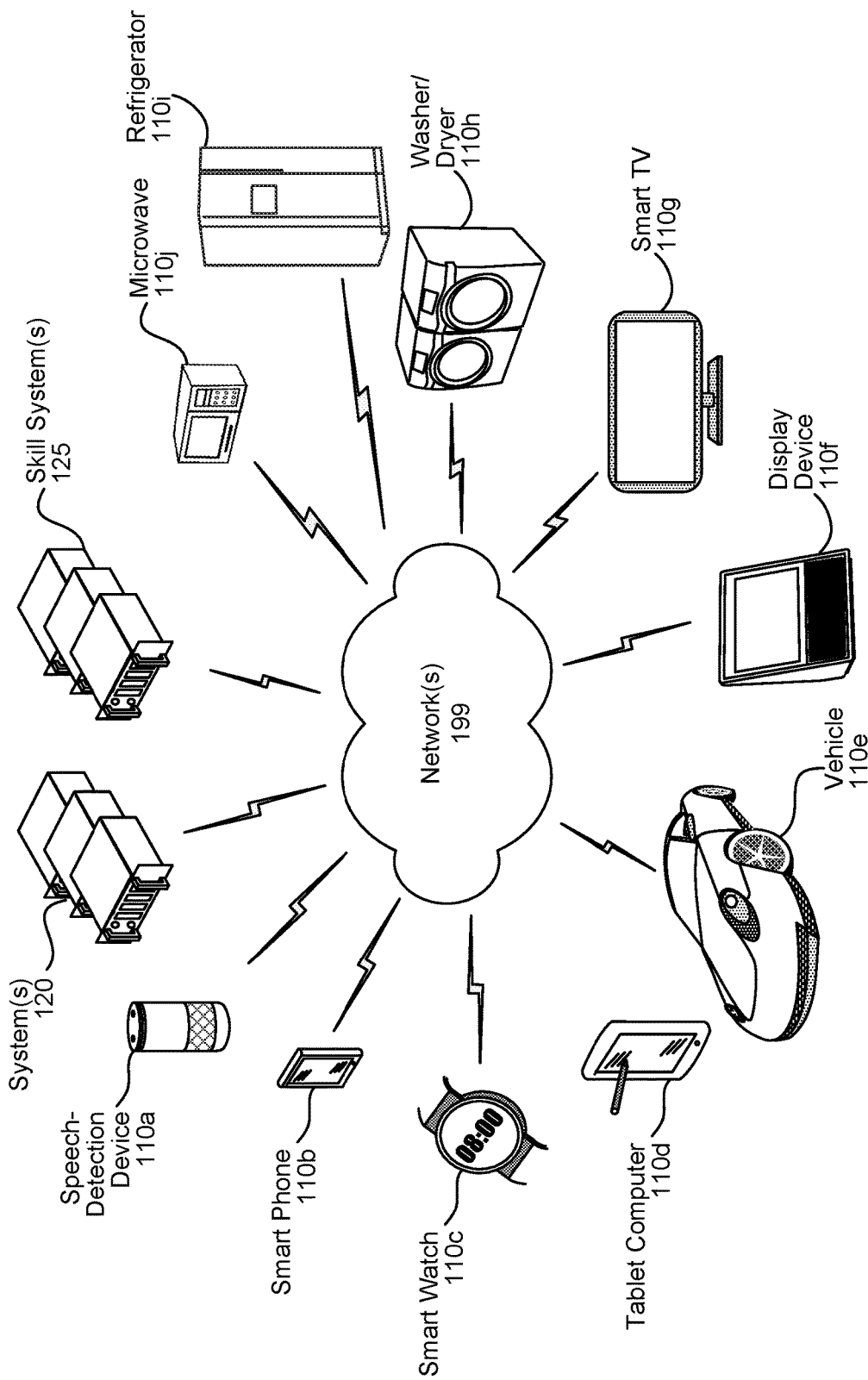
FIG. 17 illustrates an example of a computer network for use with the overall system, according to embodiments of the present disclosure.

As illustrated in FIG. 17, multiple devices (110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a washer/dryer 110*h*, a refrigerator 110*i*, and/or a microwave 110*j* may be connected to the network(s) 199 through a wireless service provider, over a WiFi or cellular network connection, or the like. Other devices are included as network-connected support devices, such as the system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   receiving, from a first device, audio data representing a spoken utterance;
   performing automatic speech recognition (ASR) processing on the audio data to generate first ASR hypothesis data corresponding to the spoken utterance;
   using a first machine learning trained component, processing the first ASR hypothesis data to generate second ASR hypothesis data representing a first rephrasing of the first ASR hypothesis data;
   using a second machine learning trained component, processing the first ASR hypothesis data to generate third ASR hypothesis data representing a second rephrasing of the first ASR hypothesis data;
   determining a first confidence value representing the second ASR hypothesis data is a rephrasing of the first ASR hypothesis data;
   determining a second confidence value representing the third ASR hypothesis data is a rephrasing of the first ASR hypothesis data;
   performing, based at least in part on the first confidence value and the second confidence value, natural language understanding (NLU) processing using the second ASR hypothesis data; and
   determining NLU results data by performing NLU processing using the second ASR hypothesis data.

2. The method of claim 1, further comprising:
   determining a first previous instance when the first ASR hypothesis data was rephrased into the second ASR hypothesis data;
   determining a second previous instance when the first ASR hypothesis data was rephrased into the third ASR hypothesis data; and
   prior to receiving the audio data, storing:
      first data associating the first ASR hypothesis data with the second ASR hypothesis data, and
      second data associating the first ASR hypothesis data with the third ASR hypothesis data,
   wherein the first machine learning trained component generates the second ASR hypothesis data using the first data, and
   wherein the second machine learning trained component generates the third ASR hypothesis data using the second data.

3. The method of claim 1, further comprising:
   performing NLU processing to generate first NLU hypothesis data representing a natural language input;
   using the first machine learning trained component, processing the first NLU hypothesis data to generate second NLU hypothesis data corresponding to a first rewrite of the first NLU hypothesis data;
   using the second machine learning trained component, processing the first NLU hypothesis data to generate third NLU hypothesis data corresponding to a second rewrite of the first NLU hypothesis data;
   determining a third confidence value representing the second NLU hypothesis data is a rewrite of the first NLU hypothesis data;
   determining a fourth confidence value representing the third NLU hypothesis data is a rewrite of the first NLU hypothesis data; and determining, based at least in part on the third confidence value and the fourth confidence value, output data using the second NLU hypothesis data.

4. The method of claim 3, further comprising:
determining a first previous instance when the first NLU hypothesis data was reconfigured into the second NLU hypothesis data;
determining a second previous instance when the first NLU hypothesis data was reconfigured into the third NLU hypothesis data; and
prior to performing NLU processing to generate the first NLU hypothesis data, storing:
   first data associating the first NLU hypothesis data with the second NLU hypothesis data, and
   second data associating the first NLU hypothesis data with the third NLU hypothesis data,
wherein the first machine learning trained component generates the second NLU hypothesis data using the first data,
wherein the second machine learning trained component generates the third NLU hypothesis data using the second data.

5. A method comprising:
receiving first data representing a first user input;
using a first machine learning trained component, processing the first data to generate second data corresponding to a first rephrasing of the first user input;
using a second machine learning trained component that is different than the first machine learning trained component, processing the first data to generate third data corresponding to a second rephrasing of the first user input;
determining a first confidence value representing the second data corresponds to the first user input;
determining a second confidence value representing the third data corresponds to the first user input; and
performing, based at least in part on the first confidence value and the second confidence value, natural language understanding (NLU) processing using the second data.

6. The method of claim 5, wherein:
receiving the first data comprises receiving first automatic speech recognition (ASR) hypothesis data;
processing the first data to generate the second data comprises generating second ASR hypothesis data corresponding to the first rephrasing of the first user input; and
processing the first data to generate the third data comprises generating third ASR hypothesis data corresponding to the second rephrasing of the first user input.

7. The method of claim 5, wherein:
the first user input is a spoken natural language input;
receiving the first data comprises receiving first natural language understanding (NLU) hypothesis data generated from NLU processing of automatic speech recognition (ASR) hypothesis data representing the spoken natural language input;
processing the first data to generate the second data comprises generating second NLU hypothesis data corresponding to the first rephrasing of the first user input; and
processing the first data to generate the third data comprises generating third NLU hypothesis data corresponding to the second rephrasing of the first user input.

8. The method of claim 5, wherein:
the first user input is a non-spoken natural language input;
receiving the first data comprises receiving first natural language understanding (NLU) hypothesis data representing the non-spoken natural language input;
processing the first data to generate the second data comprises generating second NLU hypothesis data corresponding to the first rephrasing of the first user input; and
processing the first data to generate the third data comprises generating third NLU hypothesis data corresponding to the second rephrasing of the first user input.

9. The method of claim 5, further comprising:
determining a first previous instance when the first data was reworked into the second data;
determining a second previous instance when the first data was reworked into the third data; and
prior to receiving the first data, storing:
   fourth data associating the first data with the second data, and
   fifth data associating the first data with the third data,
wherein the first machine learning trained component generates the second data based at least in part on the fourth data,
wherein the second machine learning trained component generates the third data based at least in part on the fifth data.

10. The method of claim 5, further comprising:
determining the first data is associated with a third confidence value; and
determining the third confidence value fails to satisfy a confidence condition,
wherein the first data is processed, using the first machine learning trained component, based at least in part on determining the third confidence value fails to satisfy the confidence condition,
wherein the first data is processed, using the second machine learning trained component, based at least in part on determining the third confidence value fails to satisfy the confidence condition.

11. The method of claim 5, further comprising:
determining the first data is associated with a third confidence value;
determining the third confidence value is greater than the first confidence value; and
determining, based at least in part on determining the third confidence value is greater than the first confidence value, output data based at least in part on the first data.

12. The method of claim 5, further comprising:
receiving fourth data representing a second user input;
using the first machine learning trained component, processing the fourth data to generate fifth data corresponding to a first rephrasing of the second user input;
using the second machine learning trained component, processing the fourth data to generate sixth data corresponding to a second rephrasing of the second user input;
determining a third confidence value associated with the fourth data;
determining a fourth confidence value associated with the fifth data;
determining a fifth confidence value associated with the sixth data;
determining the third confidence value is greater than the fourth confidence value and the fifth confidence value; and performing, based at least in part on the third confidence value being greater than the fourth confidence value and the fifth confidence value, NLU processing using the fourth data.

13. A system comprising:
at least one processor; and
at least one memory comprising instructions that, when executed by the at least one processor, cause the system to:
receive first data representing a first user input;
using a first machine learning trained component, process the first data to generate second data corresponding to a first rephrasing of the first user input;
using a second machine learning trained component that is different from the first machine learning trained component, process the first data to generate third data corresponding to a second rephrasing of the first user input;
determine a first confidence value representing the second data corresponds to the first user input;
determine a second confidence value representing the third data corresponds to the first user input; and
perform, based at least in part on the first confidence value and the second confidence value, natural language understanding (NLU) processing using the second data.

14. The system of claim 13, wherein:
the first data is first automatic speech recognition (ASR) hypothesis data;
the second data is second ASR hypothesis data corresponding to the first rephrasing of the first user input; and
the third data is third ASR hypothesis data corresponding to the second rephrasing of the first user input.

15. The system of claim 13, wherein:
the first user input is a spoken natural language input;
the first data is first natural language understanding (NLU) hypothesis data generated from NLU processing of automatic speech recognition (ASR) hypothesis data representing the spoken natural language input;
the second data is second NLU hypothesis data corresponding to the first rephrasing of the first user input; and
the third data is third NLU hypothesis data corresponding to the second rephrasing of the first user input.

16. The system of claim 13, wherein:
the first user input is a non-spoken natural language input;
the first data is first natural language understanding (NLU) hypothesis data representing the non-spoken natural language input;
the second data is second NLU hypothesis data corresponding to the first rephrasing of the first user input; and
the third data is third NLU hypothesis data corresponding to the second rephrasing of the first user input.

17. The system of claim 13, wherein the at least one memory further comprises instructions that, when executed by the at least one processor, further cause the system to:
determine a first previous instance when the first data was reworked into the second data;
determine a second previous instance when the first data was reworked into the third data; and
prior to receiving the first data, store:
fourth data associating the first data with the second data, and
fifth data associating the first data with the third data,
wherein the first machine learning trained component generates the second data based at least in part on the fourth data,
wherein the second machine learning trained component generates the third data based at least in part on the fifth data.

18. The system of claim 13, wherein the at least one memory further comprises instructions that, when executed by the at least one processor, further cause the system to:
determine the first data is associated with a third confidence value; and
determine the third confidence value fails to satisfy a confidence condition,
wherein the first data is processed, using the first machine learning trained component, based at least in part on determining the third confidence value fails to satisfy the confidence condition,
wherein the first data is processed, using the second machine learning trained component, based at least in part on determining the third confidence value fails to satisfy the confidence condition.

19. The system of claim 13, wherein the at least one memory further comprises instructions that, when executed by the at least one processor, further cause the system to:
determine the first data is associated with a third confidence value;
determine the third confidence value is greater than the first confidence value; and
determine, based at least in part on determining the third confidence value is greater than the first confidence value, output data based at least in part on the first data.

20. The system of claim 13, wherein the at least one memory further comprises instructions that, when executed by the at least one processor, further cause the system to:
receive fourth data representing a second user input;
using the first machine learning trained component, process the fourth data to generate fifth data corresponding to a first rephrasing of the second user input;
using the second machine learning trained component, process the fourth data to generate sixth data corresponding to a second rephrasing of the second user input;
determine a third confidence value associated with the fourth data;
determine a fourth confidence value associated the fifth data;
determine a fifth confidence value associated with the sixth data;
determine the third confidence value is greater than the fourth confidence value and the fifth confidence value; and
perform, based at least in part on the third confidence value being greater than the fourth confidence value and the fifth confidence value, NLU processing using the fourth data.

\* \* \* \* \*